(12) United States Patent
Noyes

(10) Patent No.: US 9,731,970 B2
(45) Date of Patent: *Aug. 15, 2017

(54) METHODS AND SYSTEMS FOR THERMAL ENERGY RECOVERY FROM PRODUCTION OF SOLID CARBON MATERIALS BY REDUCING CARBON OXIDES

(71) Applicant: Seerstone LLC, Provo, UT (US)

(72) Inventor: Dallas B. Noyes, Provo, UT (US)

(73) Assignee: Seerstone LLC, Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/389,675

(22) PCT Filed: Mar. 15, 2013

(86) PCT No.: PCT/US2013/000076
§ 371 (c)(1),
(2) Date: Sep. 30, 2014

(87) PCT Pub. No.: WO2013/158159
PCT Pub. Date: Oct. 24, 2013

(65) Prior Publication Data
US 2015/0064096 A1 Mar. 5, 2015

Related U.S. Application Data

(60) Provisional application No. 61/624,573, filed on Apr. 16, 2012.

(51) Int. Cl.
*C01B 31/02* (2006.01)
*F22B 1/22* (2006.01)
*B01J 19/02* (2006.01)
*B01J 19/24* (2006.01)

(52) U.S. Cl.
CPC ............. *C01B 31/02* (2013.01); *B01J 19/02* (2013.01); *B01J 19/24* (2013.01); *F22B 1/22* (2013.01); *B01J 2219/02* (2013.01); *Y02P 20/124* (2015.11)

(58) Field of Classification Search
CPC .................................................. C01B 31/02
See application file for complete search history.

(56) References Cited

U.S. PATENT DOCUMENTS

| | | |
|---|---|---|
| 1,478,730 A | 12/1923 | Brownlee |
| 1,735,925 A | 11/1929 | Jaeger |
| 1,746,464 A | 2/1930 | Fischer et al. |
| 1,964,744 A | 7/1934 | Odell |
| 2,404,869 A | 7/1946 | Sorrentino |
| 2,429,980 A | 11/1947 | Allinson |
| 2,440,424 A | 4/1948 | Wiegand et al. |
| 2,745,973 A | 5/1956 | Rappaport |
| 2,796,331 A | 6/1957 | Kauffman et al. |
| 2,800,616 A | 7/1957 | Becker |
| 2,811,653 A | 10/1957 | Moore |
| 2,819,414 A | 1/1958 | Sherwood et al. |
| 2,837,666 A | 6/1958 | Linder |
| 2,976,433 A | 3/1961 | Rappaport et al. |
| 3,094,634 A | 6/1963 | Rappaport |
| 3,172,774 A | 3/1965 | Diefendorf |
| 3,249,830 A | 5/1966 | Adany |
| 3,378,345 A | 4/1968 | Bourdeau et al. |
| 3,634,999 A | 1/1972 | Howard et al. |
| 3,714,474 A | 1/1973 | Hoff |
| 3,846,478 A | 11/1974 | Cummins |
| 3,905,748 A | 9/1975 | Cairo et al. |
| 4,024,420 A | 5/1977 | Anthony et al. |
| 4,126,000 A | 11/1978 | Funk |
| 4,197,281 A | 4/1980 | Muenger |
| 4,200,554 A | 4/1980 | Lauder |
| 4,235,855 A * | 11/1980 | Cleveland ............. C04B 35/195 264/655 |
| 4,602,477 A | 7/1986 | Lucadamo et al. |
| 4,628,143 A | 12/1986 | Brotz |
| 4,663,230 A | 5/1987 | Tennent |
| 4,710,483 A | 12/1987 | Burk et al. |

(Continued)

FOREIGN PATENT DOCUMENTS

| CN | 1344740 A | 4/2002 |
|---|---|---|
| EP | 0945402 A1 | 9/1999 |

(Continued)

OTHER PUBLICATIONS

International Preliminary Report on Patentability, for International Application No. PCT/US2013/000076, dated Oct. 21, 2014, 3 pages.

Abatzoglou, Nicolas et al., "The use of catalytic reforming reactions for C02 sequestration as carbon nanotubes," Proceedings of the 2006 IASME/WSEAS International Conference on Energy & Environmental Systems, Chalkida, Greece, May 8-10, 2006 (pp. 21-26) (available at: http://www.wseas.us/e-library/conferences/2006evia/papers/516-19 3.pdf).

Abatzoglou, Nicolas et al., "Green Diesel from Fischer-Tropsch Synthesis: Challenges and Hurdles," Proc. of the 3rd IASME/WSEAS Int. Conf. on Energy, Environment, Ecosystems and Sustainable Development, Agios Nikolaos, Greece, Jul. 24-26, 2007, pp. 223-232.

Baker, B. A. and G. D. Smith "Metal Dusting in a Laboratory Environment—Alloying Addition Effects," Special Metals Corporation, undated.

(Continued)

*Primary Examiner* — Stuart Hendrickson
(74) *Attorney, Agent, or Firm* — TraskBritt P.C.

(57) ABSTRACT

A method of thermal energy recovery from production of at least one solid carbon material comprises reacting at least one carbon oxide material and at least one gaseous reducing material at a temperature of greater than or equal to about 400° C., at a pressure greater than or equal to about $1\times10^5$ pascal, and in the presence of at least one catalyst material to produce at least one solid carbon material and a gaseous effluent stream comprising water vapor. Thermal energy is extracted from the gaseous effluent stream comprising water vapor. Other methods of generating recoverable thermal energy are disclosed, as is a solid carbon production system having thermal energy recovery.

13 Claims, 7 Drawing Sheets

(56) References Cited

U.S. PATENT DOCUMENTS

| | | |
|---|---|---|
| 4,725,346 A | 2/1988 | Joshi |
| 4,727,207 A | 2/1988 | Paparizos et al. |
| 4,746,458 A | 5/1988 | Brotz |
| 4,855,091 A | 8/1989 | Geus et al. |
| 4,900,368 A | 2/1990 | Brotz |
| 5,008,579 A | 4/1991 | Conley et al. |
| 5,021,139 A | 6/1991 | Hartig et al. |
| 5,082,505 A | 1/1992 | Cota et al. |
| 5,122,332 A | 6/1992 | Russell |
| 5,133,190 A | 7/1992 | Abdelmalek |
| 5,149,584 A | 9/1992 | Baker et al. |
| 5,187,030 A | 2/1993 | Firmin et al. |
| 5,260,621 A | 11/1993 | Little et al. |
| 5,396,141 A | 3/1995 | Jantz |
| 5,413,866 A | 5/1995 | Baker et al. |
| 5,456,897 A | 10/1995 | Moy et al. |
| 5,526,374 A | 6/1996 | Uebber |
| 5,531,424 A | 7/1996 | Whipp |
| 5,569,635 A | 10/1996 | Moy et al. |
| 5,572,544 A | 11/1996 | Mathur et al. |
| 5,578,543 A | 11/1996 | Tennent et al. |
| 5,589,152 A | 12/1996 | Tennent et al. |
| 5,624,542 A | 4/1997 | Shen et al. |
| 5,641,466 A | 6/1997 | Ebbesen et al. |
| 5,648,056 A | 7/1997 | Tanaka |
| 5,650,370 A | 7/1997 | Tennent et al. |
| 5,691,054 A | 11/1997 | Tennent et al. |
| 5,707,916 A | 1/1998 | Snyder et al. |
| 5,726,116 A | 3/1998 | Moy et al. |
| 5,747,161 A | 5/1998 | Iijima |
| 5,780,101 A | 7/1998 | Nolan et al. |
| 5,859,484 A | 1/1999 | Mannik et al. |
| 5,877,110 A | 3/1999 | Snyder et al. |
| 5,910,238 A | 6/1999 | Cable et al. |
| 5,965,267 A | 10/1999 | Nolan et al. |
| 5,997,832 A | 12/1999 | Lieber et al. |
| 6,099,965 A | 8/2000 | Tennent et al. |
| 6,159,892 A | 12/2000 | Moy et al. |
| 6,183,714 B1 | 2/2001 | Smalley et al. |
| 6,203,814 B1 | 3/2001 | Fisher et al. |
| 6,221,330 B1 | 4/2001 | Moy et al. |
| 6,232,706 B1 | 5/2001 | Dai et al. |
| 6,239,057 B1 | 5/2001 | Ichikawa et al. |
| 6,261,532 B1 | 7/2001 | Ono |
| 6,262,129 B1 | 7/2001 | Murray et al. |
| 6,294,144 B1 | 9/2001 | Moy et al. |
| 6,333,016 B1 | 12/2001 | Resasco et al. |
| 6,346,189 B1 | 2/2002 | Dai et al. |
| 6,361,861 B2 | 3/2002 | Gao |
| 6,375,917 B1 | 4/2002 | Mandeville et al. |
| 6,413,487 B1 | 7/2002 | Resasco et al. |
| 6,423,288 B2 | 7/2002 | Mandeville et al. |
| 6,426,442 B1 | 7/2002 | Ichikawa et al. |
| 6,465,813 B2 | 10/2002 | Ihm |
| 6,518,218 B1 | 2/2003 | Sun et al. |
| 6,596,101 B2 | 7/2003 | Weihs et al. |
| 6,645,455 B2 | 11/2003 | Margrave et al. |
| 6,683,783 B1 | 1/2004 | Liu et al. |
| 6,686,311 B2 | 2/2004 | Sun et al. |
| 6,692,717 B1 | 2/2004 | Smalley et al. |
| 6,713,519 B2 | 3/2004 | Wang et al. |
| 6,749,827 B2 | 6/2004 | Smalley et al. |
| 6,761,870 B1 | 7/2004 | Smalley et al. |
| 6,790,425 B1 | 9/2004 | Smalley et al. |
| 6,800,369 B2 | 10/2004 | Gimzewski et al. |
| 6,827,918 B2 | 12/2004 | Margrave et al. |
| 6,827,919 B1 | 12/2004 | Moy et al. |
| 6,835,330 B2 | 12/2004 | Nishino et al. |
| 6,835,366 B1 | 12/2004 | Margrave et al. |
| 6,841,139 B2 | 1/2005 | Liu et al. |
| 6,843,843 B2 | 1/2005 | Takahashi et al. |
| 6,855,301 B1 | 2/2005 | Rich et al. |
| 6,855,593 B2 | 2/2005 | Andoh |
| 6,875,412 B2 | 4/2005 | Margrave et al. |
| 6,890,986 B2 | 5/2005 | Pruett |
| 6,899,945 B2 | 5/2005 | Smalley et al. |
| 6,905,544 B2 | 6/2005 | Setoguchi et al. |
| 6,913,740 B2 | 7/2005 | Polverejan et al. |
| 6,913,789 B2 | 7/2005 | Smalley et al. |
| 6,916,434 B2 | 7/2005 | Nishino et al. |
| 6,919,064 B2 | 7/2005 | Resasco et al. |
| 6,936,233 B2 | 8/2005 | Smalley et al. |
| 6,949,237 B2 | 9/2005 | Smalley et al. |
| 6,955,800 B2 | 10/2005 | Resasco et al. |
| 6,960,389 B2 | 11/2005 | Tennent et al. |
| 6,962,685 B2 | 11/2005 | Sun |
| 6,979,709 B2 | 12/2005 | Smalley et al. |
| 6,986,876 B2 | 1/2006 | Smalley et al. |
| 6,998,358 B2 | 2/2006 | French et al. |
| 7,011,771 B2 | 3/2006 | Gao et al. |
| 7,041,620 B2 | 5/2006 | Smalley et al. |
| 7,045,108 B2 | 5/2006 | Jiang et al. |
| 7,048,999 B2 | 5/2006 | Smalley et al. |
| 7,052,668 B2 | 5/2006 | Smalley et al. |
| 7,067,098 B2 | 6/2006 | Colbert et al. |
| 7,071,406 B2 | 7/2006 | Smalley et al. |
| 7,074,379 B2 | 7/2006 | Moy et al. |
| 7,094,385 B2 | 8/2006 | Beguin et al. |
| 7,094,386 B2 | 8/2006 | Resasco et al. |
| 7,094,679 B1 | 8/2006 | Li et al. |
| 7,097,820 B2 | 8/2006 | Colbert et al. |
| 7,105,596 B2 | 9/2006 | Smalley et al. |
| 7,125,534 B1 | 10/2006 | Smalley et al. |
| 7,132,062 B1 | 11/2006 | Howard |
| 7,135,159 B2 | 11/2006 | Shaffer et al. |
| 7,135,160 B2 | 11/2006 | Yang et al. |
| 7,150,864 B1 | 12/2006 | Smalley et al. |
| 7,157,068 B2 | 1/2007 | Li et al. |
| 7,160,532 B2 | 1/2007 | Liu et al. |
| 7,169,329 B2 | 1/2007 | Wong et al. |
| 7,201,887 B2 | 4/2007 | Smalley et al. |
| 7,204,970 B2 | 4/2007 | Smalley et al. |
| 7,205,069 B2 | 4/2007 | Smalley et al. |
| 7,212,147 B2 | 5/2007 | Messano |
| 7,214,360 B2 | 5/2007 | Chen et al. |
| 7,250,148 B2 | 7/2007 | Yang et al. |
| 7,270,795 B2 | 9/2007 | Kawakami et al. |
| 7,291,318 B2 | 11/2007 | Sakurabayashi et al. |
| 7,338,648 B2 | 3/2008 | Harutyunyan et al. |
| 7,365,289 B2 | 4/2008 | Wilkes et al. |
| 7,374,793 B2 | 5/2008 | Furukawa et al. |
| 7,390,477 B2 | 6/2008 | Smalley et al. |
| 7,396,798 B2 | 7/2008 | Ma et al. |
| 7,408,186 B2 | 8/2008 | Merkulov et al. |
| 7,410,628 B2 | 8/2008 | Bening et al. |
| 7,413,723 B2 | 8/2008 | Niu et al. |
| 7,452,828 B2 | 11/2008 | Hirakata et al. |
| 7,459,137 B2 | 12/2008 | Tour et al. |
| 7,459,138 B2 | 12/2008 | Resasco et al. |
| 7,473,873 B2 | 1/2009 | Biris et al. |
| 7,510,695 B2 | 3/2009 | Smalley et al. |
| 7,527,780 B2 | 5/2009 | Margrave et al. |
| 7,563,427 B2 | 7/2009 | Wei et al. |
| 7,563,428 B2 | 7/2009 | Resasco et al. |
| 7,569,203 B2 | 8/2009 | Fridman et al. |
| 7,572,426 B2 | 8/2009 | Strano et al. |
| 7,585,483 B2 * | 9/2009 | Edwin et al. .............. 423/447.3 |
| 7,601,322 B2 | 10/2009 | Huang |
| 7,611,579 B2 | 11/2009 | Lashmore et al. |
| 7,615,204 B2 | 11/2009 | Ajayan et al. |
| 7,618,599 B2 | 11/2009 | Kim et al. |
| 7,622,059 B2 | 11/2009 | Bordere et al. |
| 7,632,569 B2 | 12/2009 | Smalley et al. |
| 7,645,933 B2 | 1/2010 | Narkis et al. |
| 7,655,302 B2 | 2/2010 | Smalley et al. |
| 7,670,510 B2 | 3/2010 | Wong et al. |
| 7,700,065 B2 | 4/2010 | Fujioka et al. |
| 7,704,481 B2 | 4/2010 | Higashi et al. |
| 7,718,283 B2 | 5/2010 | Raffaelle et al. |
| 7,719,265 B2 | 5/2010 | Harutyunyan et al. |
| 7,731,930 B2 | 6/2010 | Taki et al. |
| 7,736,741 B2 | 6/2010 | Maruyama et al. |
| 7,740,825 B2 | 6/2010 | Tohji et al. |
| 7,749,477 B2 | 7/2010 | Jiang et al. |

(56) References Cited

U.S. PATENT DOCUMENTS

| | | |
|---|---|---|
| 7,754,182 B2 | 7/2010 | Jiang et al. |
| 7,772,447 B2 | 8/2010 | Iaccino et al. |
| 7,780,939 B2 | 8/2010 | Margrave et al. |
| 7,785,558 B2 | 8/2010 | Hikata |
| 7,790,228 B2 | 9/2010 | Suekane et al. |
| 7,794,690 B2 | 9/2010 | Abatzoglou et al. |
| 7,794,797 B2 | 9/2010 | Vasenkov |
| 7,799,246 B2 | 9/2010 | Bordere et al. |
| 7,811,542 B1 | 10/2010 | McElrath et al. |
| 7,824,648 B2 | 11/2010 | Jiang et al. |
| 7,837,968 B2 | 11/2010 | Chang et al. |
| 7,838,843 B2 | 11/2010 | Kawakami et al. |
| 7,842,271 B2 | 11/2010 | Petrik |
| 7,854,945 B2 | 12/2010 | Fischer et al. |
| 7,854,991 B2 | 12/2010 | Hata et al. |
| 7,858,648 B2 | 12/2010 | Bianco et al. |
| 7,871,591 B2 | 1/2011 | Harutyunyan et al. |
| 7,883,995 B2 | 2/2011 | Mitchell et al. |
| 7,887,774 B2 | 2/2011 | Strano et al. |
| 7,888,543 B2 | 2/2011 | Iaccino et al. |
| 7,897,209 B2 | 3/2011 | Shibuya et al. |
| 7,901,654 B2 | 3/2011 | Harutyunyan |
| 7,906,095 B2 | 3/2011 | Kawabata |
| 7,919,065 B2 | 4/2011 | Pedersen et al. |
| 7,923,403 B2 | 4/2011 | Ma et al. |
| 7,923,615 B2 | 4/2011 | Silvy et al. |
| 7,932,419 B2 | 4/2011 | Liu et al. |
| 7,947,245 B2 | 5/2011 | Tada et al. |
| 7,951,351 B2 | 5/2011 | Ma et al. |
| 7,964,174 B2 | 6/2011 | Dubin et al. |
| 7,981,396 B2 | 7/2011 | Harutyunyan |
| 7,988,861 B2 | 8/2011 | Pham-Huu et al. |
| 7,993,594 B2 | 8/2011 | Wei et al. |
| 8,012,447 B2 | 9/2011 | Harutyunyan et al. |
| 8,017,282 B2 | 9/2011 | Choi et al. |
| 8,017,892 B2 | 9/2011 | Biris et al. |
| 8,038,908 B2 | 10/2011 | Hirai et al. |
| 8,114,518 B2 | 2/2012 | Hata et al. |
| 8,138,384 B2 | 3/2012 | Iaccino et al. |
| 8,173,096 B2 | 5/2012 | Chang et al. |
| 8,178,049 B2 | 5/2012 | Shiraki et al. |
| 8,226,902 B2 | 7/2012 | Jang et al. |
| 8,314,044 B2 | 11/2012 | Jangbarwala |
| 8,679,444 B2 * | 3/2014 | Noyes .................. 423/447.2 |
| 2001/0009119 A1 | 7/2001 | Murray et al. |
| 2002/0009637 A1 | 1/2002 | Murakami et al. |
| 2002/0054849 A1 | 5/2002 | Baker et al. |
| 2002/0102193 A1 | 8/2002 | Smalley et al. |
| 2002/0102196 A1 | 8/2002 | Smalley et al. |
| 2002/0127169 A1 | 9/2002 | Smalley et al. |
| 2002/0127170 A1 | 9/2002 | Hong et al. |
| 2002/0172767 A1 | 11/2002 | Grigorian et al. |
| 2003/0059364 A1 | 3/2003 | Prilutskiy |
| 2003/0147802 A1 | 8/2003 | Smalley et al. |
| 2004/0053440 A1 | 3/2004 | Lai et al. |
| 2004/0070009 A1 | 4/2004 | Resasco et al. |
| 2004/0105807 A1 | 6/2004 | Fan et al. |
| 2004/0111968 A1 | 6/2004 | Day et al. |
| 2004/0151654 A1 | 8/2004 | Wei et al. |
| 2004/0194705 A1 | 10/2004 | Dai et al. |
| 2004/0197260 A1 | 10/2004 | Resasco et al. |
| 2004/0202603 A1 | 10/2004 | Fischer et al. |
| 2004/0234445 A1 | 11/2004 | Serp et al. |
| 2004/0247503 A1 | 12/2004 | Hyeon |
| 2004/0265212 A1 | 12/2004 | Varadan et al. |
| 2005/0002850 A1 | 1/2005 | Niu et al. |
| 2005/0002851 A1 | 1/2005 | McElrath et al. |
| 2005/0025695 A1 | 2/2005 | Pradhan |
| 2005/0042162 A1 | 2/2005 | Resasco et al. |
| 2005/0046322 A1 | 3/2005 | Kim et al. |
| 2005/0074392 A1 | 4/2005 | Yang et al. |
| 2005/0079118 A1 | 4/2005 | Maruyama et al. |
| 2005/0100499 A1 | 5/2005 | Oya et al. |
| 2005/0176990 A1 | 8/2005 | Coleman et al. |
| 2005/0220695 A1 | 10/2005 | Abatzoglou et al. |
| 2005/0244325 A1 | 11/2005 | Nam et al. |
| 2005/0276743 A1 | 12/2005 | Lacombe et al. |
| 2006/0013757 A1 | 1/2006 | Edwin et al. |
| 2006/0032330 A1 | 2/2006 | Sato |
| 2006/0045837 A1 | 3/2006 | Nishimura |
| 2006/0078489 A1 | 4/2006 | Harutyunyan et al. |
| 2006/0104884 A1 | 5/2006 | Shaffer et al. |
| 2006/0104886 A1 | 5/2006 | Wilson |
| 2006/0104887 A1 | 5/2006 | Fujioka et al. |
| 2006/0133990 A1 | 6/2006 | Hyeon et al. |
| 2006/0141346 A1 | 6/2006 | Gordon et al. |
| 2006/0165988 A1 | 7/2006 | Chiang et al. |
| 2006/0191835 A1 | 8/2006 | Petrik et al. |
| 2006/0199770 A1 | 9/2006 | Bianco et al. |
| 2006/0204426 A1 | 9/2006 | Akins et al. |
| 2006/0225534 A1 | 10/2006 | Swihart et al. |
| 2006/0239890 A1 | 10/2006 | Chang et al. |
| 2006/0239891 A1 | 10/2006 | Niu et al. |
| 2006/0245996 A1 | 11/2006 | Xie et al. |
| 2006/0275956 A1 | 12/2006 | Konesky |
| 2007/0003470 A1 | 1/2007 | Smalley et al. |
| 2007/0020168 A1 | 1/2007 | Asmussen et al. |
| 2007/0031320 A1 | 2/2007 | Jiang et al. |
| 2007/0080605 A1 | 4/2007 | Chandrashekhar et al. |
| 2007/0116631 A1 | 5/2007 | Li et al. |
| 2007/0148962 A1 | 6/2007 | Kauppinen et al. |
| 2007/0149392 A1 | 6/2007 | Ku et al. |
| 2007/0154382 A1 | 7/2007 | Edwin et al. |
| 2007/0183959 A1 | 8/2007 | Charlier et al. |
| 2007/0189953 A1 | 8/2007 | Bai et al. |
| 2007/0207318 A1 | 9/2007 | Jin et al. |
| 2007/0209093 A1 | 9/2007 | Tohji et al. |
| 2007/0253886 A1 | 11/2007 | Abatzoglou et al. |
| 2007/0264187 A1 | 11/2007 | Harutyunyan et al. |
| 2007/0280876 A1 | 12/2007 | Tour et al. |
| 2007/0281087 A1 | 12/2007 | Harutyunyan et al. |
| 2008/0003170 A1 | 1/2008 | Buchholz et al. |
| 2008/0003182 A1 | 1/2008 | Wilson et al. |
| 2008/0008760 A1 | 1/2008 | Bianco et al. |
| 2008/0014654 A1 | 1/2008 | Weisman et al. |
| 2008/0095695 A1 | 4/2008 | Shanov et al. |
| 2008/0118426 A1 | 5/2008 | Li et al. |
| 2008/0160312 A1 | 7/2008 | Furukawa et al. |
| 2008/0169061 A1 | 7/2008 | Tour et al. |
| 2008/0175785 A1 | 7/2008 | Mitra et al. |
| 2008/0176069 A1 | 7/2008 | Ma et al. |
| 2008/0182155 A1 | 7/2008 | Choi et al. |
| 2008/0193367 A1 | 8/2008 | Kalck et al. |
| 2008/0217588 A1 | 9/2008 | Arnold et al. |
| 2008/0226538 A1 | 9/2008 | Rumpf et al. |
| 2008/0233402 A1 | 9/2008 | Carlson et al. |
| 2008/0260618 A1 | 10/2008 | Kawabata |
| 2008/0274277 A1 | 11/2008 | Rashidi et al. |
| 2008/0279753 A1 | 11/2008 | Harutyunyan |
| 2008/0280136 A1 | 11/2008 | Zachariah et al. |
| 2008/0296537 A1 | 12/2008 | Gordon et al. |
| 2008/0299029 A1 | 12/2008 | Grosboll et al. |
| 2008/0305028 A1 | 12/2008 | McKeigue et al. |
| 2008/0305029 A1 | 12/2008 | McKeigue et al. |
| 2008/0305030 A1 | 12/2008 | McKeigue et al. |
| 2008/0318357 A1 | 12/2008 | Raffaelle et al. |
| 2009/0001326 A1 | 1/2009 | Sato et al. |
| 2009/0004075 A1 | 1/2009 | Chung et al. |
| 2009/0011128 A1 | 1/2009 | Oshima et al. |
| 2009/0035569 A1 | 2/2009 | Gonzalez Moral et al. |
| 2009/0053115 A1 | 2/2009 | Jacques et al. |
| 2009/0056802 A1 | 3/2009 | Rabani |
| 2009/0074634 A1 | 3/2009 | Tada et al. |
| 2009/0081454 A1 | 3/2009 | Axmann et al. |
| 2009/0087371 A1 | 4/2009 | Jang et al. |
| 2009/0087622 A1 | 4/2009 | Busnaina et al. |
| 2009/0124705 A1 | 5/2009 | Meyer et al. |
| 2009/0134363 A1 | 5/2009 | Bordere et al. |
| 2009/0136413 A1 | 5/2009 | Li et al. |
| 2009/0140215 A1 | 6/2009 | Buchholz et al. |
| 2009/0186223 A1 | 7/2009 | Saito et al. |
| 2009/0191352 A1 | 7/2009 | Dufaux et al. |
| 2009/0203519 A1 | 8/2009 | Abatzoglou et al. |
| 2009/0208388 A1 | 8/2009 | McKeigue et al. |

(56) References Cited

U.S. PATENT DOCUMENTS

| | | |
|---|---|---|
| 2009/0208708 A1 | 8/2009 | Wei et al. |
| 2009/0220392 A1 | 9/2009 | McKeigue et al. |
| 2009/0226704 A1 | 9/2009 | Kauppinen et al. |
| 2009/0257945 A1 | 10/2009 | Biris et al. |
| 2009/0286084 A1 | 11/2009 | Tennent et al. |
| 2009/0286675 A1 | 11/2009 | Wei et al. |
| 2009/0294753 A1 | 12/2009 | Hauge et al. |
| 2009/0297846 A1 | 12/2009 | Hata et al. |
| 2009/0297847 A1 | 12/2009 | Kim et al. |
| 2009/0301349 A1 | 12/2009 | Afzali-Ardakani et al. |
| 2010/0004468 A1 | 1/2010 | Wong et al. |
| 2010/0009204 A1 | 1/2010 | Noguchi et al. |
| 2010/0028735 A1 | 2/2010 | Basset et al. |
| 2010/0034725 A1 | 2/2010 | Harutyunyan |
| 2010/0062229 A1 | 3/2010 | Hata et al. |
| 2010/0065776 A1 | 3/2010 | Han et al. |
| 2010/0074811 A1 | 3/2010 | McKeigue et al. |
| 2010/0081568 A1 | 4/2010 | Bedworth |
| 2010/0104808 A1 | 4/2010 | Fan et al. |
| 2010/0129654 A1 | 5/2010 | Jiang et al. |
| 2010/0132259 A1 | 6/2010 | Haque |
| 2010/0132883 A1 | 6/2010 | Burke et al. |
| 2010/0150810 A1 | 6/2010 | Yoshida et al. |
| 2010/0158788 A1 | 6/2010 | Kim et al. |
| 2010/0159222 A1 | 6/2010 | Hata et al. |
| 2010/0160155 A1 | 6/2010 | Liang |
| 2010/0167053 A1 | 7/2010 | Sung et al. |
| 2010/0173037 A1 | 7/2010 | Jiang et al. |
| 2010/0173153 A1 | 7/2010 | Hata et al. |
| 2010/0196249 A1 | 8/2010 | Hata et al. |
| 2010/0196600 A1 | 8/2010 | Shibuya et al. |
| 2010/0209696 A1 | 8/2010 | Seals et al. |
| 2010/0213419 A1 | 8/2010 | Jiang et al. |
| 2010/0221173 A1 | 9/2010 | Tennent et al. |
| 2010/0222432 A1 | 9/2010 | Hua |
| 2010/0226848 A1 | 9/2010 | Nakayama et al. |
| 2010/0230642 A1 | 9/2010 | Kim et al. |
| 2010/0239489 A1 | 9/2010 | Harutyunyan et al. |
| 2010/0254860 A1 | 10/2010 | Shiraki et al. |
| 2010/0254886 A1 | 10/2010 | McElrath et al. |
| 2010/0260927 A1 | 10/2010 | Gordon et al. |
| 2010/0278717 A1 | 11/2010 | Suzuki et al. |
| 2010/0298125 A1 | 11/2010 | Kim et al. |
| 2010/0301278 A1 | 12/2010 | Hirai et al. |
| 2010/0303675 A1 | 12/2010 | Suekane et al. |
| 2010/0316556 A1 | 12/2010 | Wei et al. |
| 2010/0316562 A1 | 12/2010 | Carruthers et al. |
| 2010/0317790 A1 | 12/2010 | Jang et al. |
| 2010/0320437 A1 | 12/2010 | Gordon et al. |
| 2011/0008617 A1 | 1/2011 | Hata et al. |
| 2011/0014368 A1 | 1/2011 | Vasenkov |
| 2011/0020211 A1 | 1/2011 | Jayatissa |
| 2011/0024697 A1 | 2/2011 | Biris et al. |
| 2011/0027162 A1 | 2/2011 | Steiner, III et al. |
| 2011/0027163 A1 | 2/2011 | Shinohara et al. |
| 2011/0033367 A1 | 2/2011 | Riehl et al. |
| 2011/0039124 A1 | 2/2011 | Ikeuchi et al. |
| 2011/0053020 A1 | 3/2011 | Norton et al. |
| 2011/0053050 A1 | 3/2011 | Lim et al. |
| 2011/0060087 A1 | 3/2011 | Noguchi et al. |
| 2011/0085961 A1 | 4/2011 | Noda et al. |
| 2011/0110842 A1 | 5/2011 | Haddon |
| 2011/0117365 A1 | 5/2011 | Hata et al. |
| 2011/0120138 A1 | 5/2011 | Gaiffi et al. |
| 2011/0150746 A1 | 6/2011 | Khodadadi et al. |
| 2011/0155964 A1 | 6/2011 | Arnold et al. |
| 2011/0158892 A1 | 6/2011 | Yamaki |
| 2011/0171109 A1 | 7/2011 | Petrik |
| 2011/0174145 A1 | 7/2011 | Ogrin et al. |
| 2011/0206469 A1 | 8/2011 | Furuyama et al. |
| 2011/0298071 A9 | 12/2011 | Spencer et al. |
| 2012/0034150 A1 | 2/2012 | Noyes |
| 2012/0083408 A1 | 4/2012 | Sato et al. |
| 2012/0107610 A1 | 5/2012 | Moravsky et al. |
| 2012/0137664 A1 | 6/2012 | Shawabkeh et al. |
| 2012/0148476 A1 | 6/2012 | Hata et al. |
| 2013/0154438 A1 | 6/2013 | Tan Xing Haw |
| 2014/0021827 A1 | 1/2014 | Noyes |
| 2014/0141248 A1 | 5/2014 | Noyes |
| 2014/0348739 A1 | 11/2014 | Denton et al. |
| 2015/0059527 A1 | 3/2015 | Noyes |
| 2015/0059571 A1 | 3/2015 | Denton et al. |
| 2015/0064092 A1 | 3/2015 | Noyes |
| 2015/0064096 A1 | 3/2015 | Noyes |
| 2015/0064097 A1 | 3/2015 | Noyes |
| 2015/0071846 A1 | 3/2015 | Noyes |
| 2015/0071848 A1 | 3/2015 | Denton et al. |
| 2015/0078982 A1 | 3/2015 | Noyes |

FOREIGN PATENT DOCUMENTS

| | | |
|---|---|---|
| EP | 2186931 A1 | 5/2010 |
| EP | 2404869 A1 | 1/2012 |
| JP | 61239019 A | 10/1986 |
| JP | 10037024 | 2/1998 |
| JP | 11322315 A | 11/1999 |
| JP | 11335106 A | 12/1999 |
| JP | 2000264601 A | 9/2000 |
| JP | 2001087627 A | 4/2001 |
| JP | 2001137691 A | 5/2001 |
| JP | 2001187334 A | 7/2001 |
| JP | 2001288625 A | 10/2001 |
| JP | 2002146634 A | 5/2002 |
| JP | 2002201013 A | 7/2002 |
| JP | 2002211909 A | 7/2002 |
| JP | 2002526361 A | 8/2002 |
| JP | 2002531625 A | 9/2002 |
| JP | 339339 B2 | 10/2002 |
| JP | 3339339 B2 | 10/2002 |
| JP | 2004019018 A | 1/2004 |
| JP | 2004517789 A | 6/2004 |
| JP | 2004360099 A | 12/2004 |
| JP | 2005075725 A | 3/2005 |
| JP | 2005081519 A | 3/2005 |
| JP | 2005162567 A | 6/2005 |
| JP | 2005532976 A | 11/2005 |
| JP | 2006027949 A | 2/2006 |
| JP | 2006152490 A | 6/2006 |
| JP | 2007180546 A | 7/2007 |
| JP | 2007191840 A | 8/2007 |
| JP | 2012524015 A | 10/2012 |
| KR | 1020050072056 A | 7/2005 |
| WO | 0230816 A1 | 4/2002 |
| WO | 03018474 A1 | 3/2003 |
| WO | 2004096704 A3 | 11/2005 |
| WO | 2005103348 A1 | 11/2005 |
| WO | 2006003482 A3 | 8/2006 |
| WO | 2007086909 A3 | 11/2007 |
| WO | 2007139097 A1 | 12/2007 |
| WO | 2007126412 A3 | 6/2008 |
| WO | 2009011984 A1 | 1/2009 |
| WO | 2006130150 A3 | 4/2009 |
| WO | 2009122139 A1 | 10/2009 |
| WO | 2009145959 A1 | 12/2009 |
| WO | 2010047439 A1 | 4/2010 |
| WO | 2010087903 A1 | 8/2010 |
| WO | 2010092787 A1 | 8/2010 |
| WO | 2010120581 A1 | 10/2010 |
| WO | 2010146169 A1 | 12/2010 |
| WO | 2011009071 A1 | 1/2011 |
| WO | 2011020568 A1 | 2/2011 |
| WO | 2011029144 A1 | 3/2011 |
| WO | 2010146169 A3 | 4/2011 |
| WO | 2010124258 A3 | 5/2011 |
| WO | 2011053192 A2 | 5/2011 |
| WO | 2013090274 | 6/2013 |
| WO | 2013158155 | 10/2013 |
| WO | 2013158155 A1 | 10/2013 |
| WO | 2013158156 | 10/2013 |
| WO | 2013158156 A1 | 10/2013 |
| WO | 2013158157 A1 | 10/2013 |
| WO | 2013158158 A1 | 10/2013 |
| WO | 2013158159 A1 | 10/2013 |
| WO | 2013158160 A1 | 10/2013 |

(56) References Cited

FOREIGN PATENT DOCUMENTS

| | | |
|---|---|---|
| WO | 2013158161 A1 | 10/2013 |
| WO | 2013158438 | 10/2013 |
| WO | 2013158439 | 10/2013 |
| WO | 2013158441 | 10/2013 |
| WO | 2013162650 A1 | 10/2013 |
| WO | 2014011206 | 1/2014 |
| WO | 2014011206 A1 | 1/2014 |
| WO | 2014011631 | 1/2014 |
| WO | 2014011631 A1 | 1/2014 |
| WO | 2014085378 A1 | 6/2014 |

OTHER PUBLICATIONS

Baker, B. A. and G. D. Smith, "Alloy Solutions to Metal Dusting Problems in the PetroChemical Industry," Special Metals Corporation, undated.
Bogue, Robert, Powering Tomorrow's Sensor: A Review of Technologies—Part 1, Sensor Review, 2010, pp. 182-86, vol. 30, No. 3.
Cha, S. I., et al., "Mechanical and electrical properties of cross•linked carbon nanotubes," Carbon 46 (2008) 482-488, Elsevier, Ltd.
Cheng, H.M. et al., "Large-scale and low-cost synthesis of single-walled carbon nanotubes by the catalytic pyrolysis of hydrocarbons," Applied Physics Letters 72:3282-3284, Jun. 22, 1998 (available at: http://carbon.imr.ac.cn/file/journai/1998/98_APL_72_3282-ChengH M.pdf).
Chun, Changmin, and Ramanarayanan, Trikur A., "Metal Dusting Corrosion of Metals and Alloys," 2007.
Chung, U.C., and W.S. Chung, "Mechanism on Growth of Carbon Nanotubes Using CO—H2 Gas Mixture," Materials Science Forum vols. 475-479 (2005) pp. 3551-3554.
Dai, et al., "Single-wall nanotubes produced by metal-catalyzed disproportionation of carbon monoxide," Chemical Physics Letters 260 (1996) 471-475, Elsevier.
Dresselhaus et al., Carbon Nanotubes Synthesis, Structure, Properties, and Applications. 2001, pp. 1-9, Springer.
Garmirian, James Edwin, "Carbon Deposition in a Bosch Process Using a Cobalt and Nickel Catalyst," PhD Dissertation, Massachusetts Institute of Technology, Mar. 1980, pp. 14-185.
Grobert, Nicole, "Carbon nanotubes—becoming clean," Materials Today, vol. 10, No. 1-2, Jan.-Feb. 2007, Elsevier, pp. 28-35.
Hata, Kenji, "From Highly Efficient Impurity-Free CNT Synthesis to DWNT forests, CNTsolids and Super-Capacitors," unknown date, unknown publisher, Research Center for Advanced Carbon Materials, National Institute of Advanced Industrial Science and Technology (AIST), Tsukuba, 305-8565, Japan, Feb. 27, 2007.
Hiraoka, Tatsuki, et al., "Synthesis of Single- and Double-Walled Carbon Nanotube Forests on Conducting Metal Foils," 9 J. Am. Chem. Soc. 2006, 128, 13338-13339.
Holmes, et al.; A Carbon Dioxide Reduction Unit Using Bosch Reaction and Expendable Catalyst Cartridges; NASA; 1970; available at https://archive.org/details/nasa_techdoc_19710002858.
Huang, Z.P., et al., "Growth of highly oriented carbon nanotubes by plasma-enhanced hot filament chemical vapor deposition," Applied Physics Letters 73:3845-3847, Dec. 28, 1998.
"INCONEL® alloy 693—Excellent Resistance to Metal Dusting and High Temperature Corrosion" Special Metals Product Sheet, 2005.
Kavetsky et al., Chapter 2, Radioactive Materials, Ionizing Radiation Sources, and Radioluminescent Light Sources for Nuclear Batteries, Polymers, Phosphors, and Voltaics for Radioisotope Microbatteries, Edited by Bower et al., 2002, pp. 39-59, CRC Press.
Krestinin, A. V., et al. "Kinetics of Growth of Carbon Fibers on an Iron Catalyst in Methane Pyrolysis: A Measurement Procedure with the Use of an Optical Microscope," Kinetics and Catalysis, 2008, vol. 49, No. 1, pp. 68-78.
Lal, Archit, "Effect of Gas Composition and Carbon Activity on the Growth of Carbon Nanotubes," Masters Thesis, University of Florida, 2003.

Manasse et al., Schottky Barrier Betavoltaic Battery, IEEE Transactions on Nuclear Science, vol. NS-23, No. 1, Feb. 1976, pp. 860-870.
Manning, Michael Patrick, "An Investigation of the Bosch Process," PhD Dissertation, Massachusetts Institute of Technology, Jan. 1976.
Unknown author, "Metal Dusting," unknown publisher, undated.
Unknown author, "Metal Dusting of reducing gas furnace HK40 tube," unknown publisher, undated.
Muller-Lorenz and Grabke, Coking by metal dusting of steels, 1999, Materials and Corrosion 50, 614-621 (1999).
Nasibulin, Albert G., et al., "An essential role of C02 and H20 during single-walled CNT synthesis from carbon monoxide," Chemical Physics Letters 417 (2005) 179-184.
Nasibulin, Albert G., et al., "Correlation between catalyst particle and single-walled carbon nanotube diameters," Carbon 43 (2005) 2251-2257.
Noordin, Mohamad and Kong Yong Liew, "Synthesis of Alumina Nanofibers and Composites," in Nanofibers, pp. 405-418 (Ashok Kumar, ed., 2010) ISBN 978-953-7619-86-2 (available at http://www.intechopen.com/books/nanofibers/synthesis-of-alumina•nanofibers-and-composites).
Pender, Mark J., et al., "Molecular and polymeric precursors to boron carbide nanofibers, nanocylinders, and nanoporous ceramics," Pure Appl. Chem., vol. 75, No. 9, pp. 1287-1294, 2003.
Ruckenstein, E. and H.Y. Wang, "Carbon Deposition and Catalytic Deactivation during C02 Reforming of CH4 over Co/?-Al203 Catalysts," Journal of Catalysis, vol. 205, Issue 2, Jan. 25, 2002, pp. 289-293.
Sacco, Albert Jr., "An Investigation of the Reactions of Carbon Dioxide, Carbon Monoxide, Methane, Hydrogen, and Water over Iron, Iron Carbides, and Iron Oxides," PhD Dissertation, Massachusetts Institute of Technology, Jul. 1977, pp. 2, 15-234.
SAE 820875 Utilization of Ruthenium and Ruthenium-Iron Alloys as Bosch Process Catalysts. Jul. 19-21, 1982.
SAE 911451 Optimization of Bosch Reaction, Jul. 15-18, 1991.
Singh, Jasprit, Semiconductor Devices, An Introduction, 1994, pp. 86-93, 253-269.
Singh, Jasprit, Semiconductor Devices, Basic Principles, Chapter 6, Semiconductor Junctions with Metals and Insulators, 2001, pp. 224-244, Wiley.
Skulason, Egill, Metallic and Semiconducting Properties of Carbon Nanotubes, Modern Physics, Nov. 2005, slide presentation, 21 slides, available at https://notendur.hi.is/egillsk/stuff/annad/Egiii.Slides2.pdf, last visited Apr. 28, 2014.
Songsasen, Apisit and Paranchai Pairgreethaves, "Preparation of Carbon Nanotubes by Nickel Catalyzed Decomposition of Liquefied Petroleum Gas (LPG)," Kasetsart J. (Nat. Sci.) 35 : 354-359 (2001) (available at: http://kasetsartjournal.ku.ac.th/kuj_files/2008/A0804251023348734.pdf).
Szakalos, P., "Mechanisms and driving forces of metal dusting," Materials and Corrosion, 2003, 54, No. 10, pp. 752-762.
Tsai, Heng-Yi, et al., "A feasibility study of preparing carbon nanotubes by using a metal dusting process," Diamond & Related Materials 18 (2009) 324-327, Elsevier.
Tse, Anthony N., Si—Au Schottky Barrier Nuclear Battery, A Thesis submitted to the Faculty in partial fulfillment of the requirement for the degree of Doctor of Engineering, Thayer School of Engineering, Dartmouth College, Hanover, New Hampshire, Nov. 1972, pp. 31-57.
Wilson, Richard B., "Fundamental Investigation of the Bosch Reaction," PhD Dissertation, Massachusetts Institute of Technology, Jul. 1977, pp. 12,23, 37, 43, 44, 62, 70, 80, 83-88, 98.
Wei, et al. "The mass production of carbon nanotubes using a nano-agglomerate fluidized bed reactor: A multiscale space-time analysis," Powder Technology 183 (2008) 10-20, Elsevier.
XP-002719593 Thomson abstract, Sep. 30, 1987.
Zeng, Z., and Natesan, K., Relationship between the Growth of Carbon Nanofilaments and Metal Dusting Corrosion, 2005, Chem. Mater. 2005, 17, 3794-3801.
PCT International Search Report and Written Opinion, PCT/US2013/000076, dated Jul. 12, 2013.

(56) References Cited

OTHER PUBLICATIONS

PCT International Search Report and Written Opinion, PCT/US2013/000076, dated Dec. 16, 2013.
European Search Report for copending application EP 13778574.7 dated Sep. 28, 2015.
Chinese Office Action for copending application filed into China; now serial No. 201380020423.3 dated Sep. 25, 2015 (including English translation).
Japanese Patent Application Kokai Publication No. (JP-A) 2005-060137 (unexamined, published Japanese patent application.
Japanese Patent Application Kohyo Publication No. (JP-A) 2005-537201 (unexamined Japanese national phase publication corresponding to a non-Japanese international publication).
Japanese Patent Application Kokai Publication No. (JP-A) 2006-027948 (unexamined, published Japanese patent application.
Japanese Patent Application Kohyo Publication No. (JP-A) 2006-511437 (unexamined Japanese national phase publication corresponding to a non-Japanese international publication).
Japanese Patent Application Kokai Publication No. (JP-A) 2007-222803 (unexamined, published Japanese patent application.
Japanese Patent ApplicationKohyo Publication No. (JP-A) 2010-511580 (unexamined Japanese national phase publication corresponding to a non-Japanese international publication).
Japanese Patent Application Kohyo Publication No. (JP-A) 2010-528974 (unexamined Japanese national phase publication corresponding to a non-Japanese international publication).
Japanese Patent Application Kokai Publication No. (JP-A) H11-335106 (unexamined, published Japanese patent application).
Notice of Rejection received from the Japanese Patent Office, Mar. 2, 2017, Application No. JP2015-506977.
Japanese Patent Application Kokai Publication No. (JP-A) S54-150388 (unexamined, published Japanese patent application).

\* cited by examiner

METHODS AND SYSTEMS FOR THERMAL ENERGY RECOVERY FROM PRODUCTION OF SOLID CARBON MATERIALS BY REDUCING CARBON OXIDES

PRIORITY CLAIM

This application claims the benefit of the filing date of U.S. Provisional Patent Application Ser. No. 61/624,573, filed Apr. 16, 2012, for "Methods and Systems for Thermal Energy Recovery from Production of Solid Carbon Materials by Reducing Carbon Oxides," the disclosure of which is hereby incorporated herein in its entirety by this reference.

TECHNICAL FIELD

Embodiments of the disclosure relate generally to methods and systems of producing solid carbon material. More specifically, embodiments of the disclosure relate to methods and systems of producing solid carbon materials utilizing thermal energy recovery and conversion.

BACKGROUND

U.S. Patent Publication No. 2012/0034150 A1, published Feb. 9, 2012, the disclosure of which is hereby incorporated herein in its entirety by this reference, discloses background information hereto.

Additional information is disclosed in the following documents, listing Dallas B. Noyes as inventor, the disclosure of each of which is hereby incorporated herein in its entirety by this reference:

1. International Application No. PCT/US2013/000072, filed on even date herewith, for "Methods and Structures for Reducing Carbon Oxides with Non-Ferrous Catalysts," which claims the benefit of U.S. Ser. No. 61/624,702, filed Apr. 16, 2012;
2. International Application No. PCT/US2013/000077, filed on even date herewith, for "Methods for Producing Solid Carbon by Reducing Carbon Dioxide," which claims the benefit of U.S. Ser. No. 61/624,723, filed Apr. 16, 2012;
3. International Application No. PCT/US2013/000073, filed on even date herewith, for "Methods and Reactors for Producing Solid Carbon Nanotubes, Solid Carbon Clusters, and Forests," which claims the benefit of U.S. Ser. No. 61/624,753, filed Apr. 16, 2012;
4. International Application No. PCT/US2013/000075, filed on even date herewith, for "Methods for Treating an Offgas Containing Carbon Oxides," which claims the benefit of U.S. Ser. No. 61/624,513, filed Apr. 16, 2012;
5. International Application No. PCT/US2013/000071, filed on even date herewith, for "Methods for Using Metal Catalysts in Carbon Oxide Catalytic Converters," which claims the benefit of U.S. Ser. No. 61/624,848, filed Apr. 16, 2012;
6. International Application No. PCT/US2013/000081, filed on even date herewith, for "Methods and Systems for Capturing and Sequestering Carbon and for Reducing the Mass of Carbon Oxides in a Waste Gas Stream," which claims the benefit of U.S. Ser. No. 61/624,462, filed Apr. 16, 2012;
7. International Application No. PCT/US2013/000078, filed on even date herewith, for "Methods and Systems for Forming Ammonia and Solid Carbon Products," which claims the benefit of U.S. Ser. No. 61/671,464, filed Jul. 13, 2012; and
8. International Application No. PCT/US2013/000079, filed on even date herewith, for "Carbon Nanotubes Having a Bimodal Size Distribution," which claims the benefit of U.S. Ser. No. 61/637,229, filed Apr. 23, 2012.

Solid carbon has numerous commercial applications. These applications include longstanding uses such as uses of carbon black and carbon fibers as a filler material in tires, inks, etc., many uses for various forms of graphite (e.g. electrodes, pyrolytic graphite as heat shields) and innovative and emerging applications for buckminsterfullerene and carbon nanotubes. Conventional methods for the manufacture of various forms of solid carbon typically involve the pyrolysis of hydrocarbons in the presence of a suitable catalyst. The use of hydrocarbons as the carbon source is due to historically abundant availability and low cost of hydrocarbons. The use of carbon oxides as the carbon source in the production of solid carbon has largely been unexploited.

Carbon oxides, particularly carbon dioxide, are abundant gases that may be extracted from point source emissions such as the exhaust gases of hydrocarbon combustion or from some process off gases. Carbon dioxide may also be extracted from the air. Because point source emissions have much higher concentrations of carbon dioxide than air, they are often economical sources from which to harvest the carbon dioxide. However, the immediate availability of air may provide cost offsets by eliminating transportation costs through local manufacturing of the solid carbon products from carbon dioxide in air.

Carbon dioxide is increasingly available and inexpensive as a byproduct of power generation and chemical processes where an object may be to reduce or eliminate the emission of carbon dioxide into the atmosphere by capture and subsequent sequestration of the carbon dioxide (e.g., by injection into a geological formation). For example, the capture and sequestration of carbon dioxide is the basis for some "green" coal-fired power stations. In current practice, capture and sequestration of the carbon dioxide entails significant cost.

There are a limited number of ways that carbon, oxygen, and hydrogen can react. There is a spectrum of reactions involving these three elements wherein various equilibria have been identified. Hydrocarbon pyrolysis involves equilibria between hydrogen and carbon that favors solid carbon production, typically with little or no oxygen present. The Boudouard reaction, also called the "carbon monoxide disproportionation reaction," is the range of equilibria between carbon and oxygen that favors solid carbon production, typically with little or no hydrogen present. The Bosch reaction is within a region of equilibria where all of carbon, oxygen, and hydrogen are present under reaction conditions that also favor solid carbon production.

The relationship between the hydrocarbon pyrolysis, Boudouard, and Bosch reactions may be understood in terms of a C—H—O equilibrium diagram, as shown in FIG. 1. The C—H—O equilibrium diagram of FIG. 1 shows various known routes to solid carbon, including carbon nanotubes ("CNTs"). The hydrocarbon pyrolysis reactions are on the equilibrium line that connects hydrogen (H) and carbon (C) (i.e., the left edge of the triangle). The Boudouard, or carbon monoxide disproportionation reactions, are on the equilibrium line that connects oxygen (O) and C (i.e., the right edge of the triangle). The equilibrium lines for various temperatures that traverse the diagram show the approximate regions in which solid carbon will form. For each temperature, solid carbon may form in the regions above the associated equilibrium line, but will not generally form in the regions below the equilibrium line.

U.S. Pat. No. 7,794,690 (Abatzoglou et al.) teaches a dry reforming process for sequestration of carbon from an organic material. Abatzoglou discloses a process utilizing a 2D carbon sequestration catalyst with, optionally, a 3D dry reforming catalyst. For example, Abatzoglou discloses a two-stage process for dry reformation of an organic material (e.g., methane, ethanol) and $CO_2$ over a 3D catalyst to form syngas, in a first stage, followed by carbon sequestration of syngas over a 2D carbon steel catalyst to form CNTs and carbon nanofilaments. The 2D catalyst may be an active metal (e.g., Ni, Rh, Ru, Cu—Ni, Sn—Ni) on a nonporous metallic or ceramic support, or an iron-based catalyst (e.g., steel), on a monolith support. The 3D catalyst may be of similar composition, or may be a composite catalyst (e.g., $Ni/ZrO_2$—$Al_2O_3$) over a similar support. Abatzoglou discloses preactivation of a 2D catalyst by passing an inert gas stream over a surface of the catalyst at a temperature beyond its eutectic point to transform the iron into its alpha phase. Abatzoglou teaches minimizing water in the two-stage process or introducing water in low concentrations (0 to 10 wt %) in a reactant gas mixture during the dry reformation first stage.

It would be desirable to have new methods and systems for forming solid carbon. It would further be desirable if the new methods and systems were energy efficient, cost efficient, and relatively simple in operation.

DISCLOSURE OF THE INVENTION

Embodiments described herein include methods and systems for producing solid carbon by reducing carbon oxides, and for recovering and converting thermal energy. For example, in accordance with one embodiment described herein, a method of thermal energy recovery from production of at least one solid carbon material comprises reacting at least one carbon oxide material and at least one gaseous reducing material at a temperature of greater than or equal to about 400° C., at a pressure of greater than or equal to about $1 \times 10^5$ pascal, and in the presence of at least one catalyst material to produce at least one solid carbon material and a gaseous effluent stream comprising water vapor. Thermal energy is extracted from the gaseous effluent stream.

In additional embodiments, a method of generating recoverable thermal energy comprises providing a source gas stream comprising at least one carbon oxide and at least one gaseous reducing material to a reactor having at least one catalyst material therein. The at least one carbon oxide and the at least one reducing agent are reacted in the presence of the at least one catalyst material to produce a reaction product stream comprising at least one solid carbon material and gaseous water. The at least one solid carbon material and the gaseous water are separated. Heat is extracted from at least the gaseous water.

In yet additional embodiments, a solid carbon production system having thermal energy recovery comprises a reactor configured to convert exothermically at least one carbon oxide and at least one reducing material in the presence of at least one catalyst material to at least one solid carbon material and a gaseous reaction product stream, and at least one heat exchanger positioned and configured to recover thermal energy from at least the gaseous reaction product stream.

In yet still additional embodiments, a solid carbon production method comprises exothermically reacting at least one carbon oxide with at least one reducing gas in the presence of a catalyst in a reaction zone to produce a solid carbon material and a gaseous reaction product. Thermal energy is extracted from the reaction zone.

BRIEF DESCRIPTION OF THE DRAWINGS

Features and advantages of the disclosure will be apparent from reference to the following detailed description taken in conjunction with the accompanying drawings, in which.

MODE(S) FOR CARRYING OUT THE INVENTION

The following description provides specific details, such as catalyst types, stream compositions, and processing conditions (e.g., temperatures, pressures, flow rates, etc.) in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional systems and methods employed in the industry. In addition, only those process components and acts necessary to understand the embodiments of the disclosure are described in detail below. A person of ordinary skill in the art will understand that some process components (e.g., pipelines, line filters, valves, temperature detectors, flow detectors, pressure detectors, and the like) are inherently disclosed herein and that adding various conventional process components and acts would be in accord with the disclosure. The drawings accompanying the application are for illustrative purposes only, and are not meant to be actual views of any particular material, device, or system. Additionally, elements common between figures may retain the same numerical designation.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and accompanying drawings and do not connote or depend on any specific preference, orientation, or order, except where the context clearly indicates otherwise.

As used herein, the term "substantially," in reference to a given parameter, property, or condition, means to a degree that one of ordinary skill in the art would understand that the given parameter, property, or condition is met with a small degree of variance, such as within acceptable manufacturing tolerances.

Figure 1:
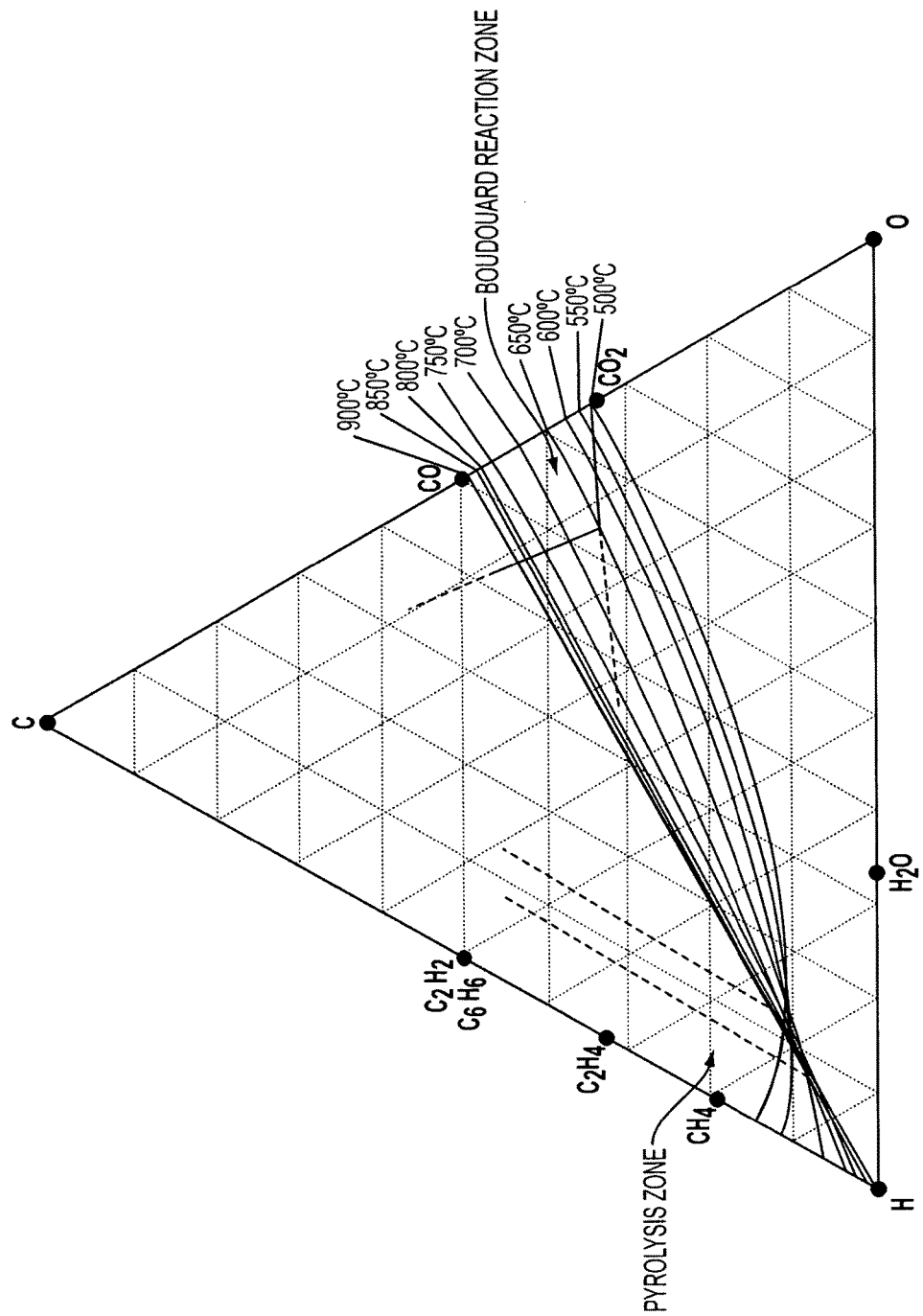
FIG. 1 depicts a C—H—O equilibrium diagram.

Methods and systems of producing solid carbon utilizing thermal energy recovery and conversion are described. The methods and systems of the disclosure facilitate the energy efficient production of at least one solid carbon material by way of a reduction reaction between at least one carbon oxide (e.g., carbon monoxide, or carbon dioxide), and at least one reducing material (e.g., hydrogen, methane, etc.) in the presence of a catalyst. The methods and systems of the disclosure may be combined with conventional methods and systems for generating each of the carbon oxide and the reducing material. Reaction conditions (e.g., temperature, pressure, residence time) for the reduction reaction may be varied to achieve a desired morphology or configuration (e.g., shape, size) of the solid carbon material. The reduction reactions of the disclosure may occur within the interior region of the C—H—O phase diagram shown in FIG. 1, wherein an equilibrium may be established between solid carbon, compounds of carbon, hydrogen, and oxygen. The interior region of C—H—O phase diagram includes several points that are favorable for the formation of CNTs, as well as other forms of solid carbon. The methods and systems of the disclosure facilitate the capture excess thermal energy from the reduction reactions to enhance the energy efficiency of the solid carbon material production process. Recovered excess thermal energy may, for example, be utilized to at least partially power one or more of the devices or apparatuses. The methods and systems of the disclosure advantegously enable energy efficient ways of producing valuable solid carbon material including, but not limited to, CNTs.

Figure 2:
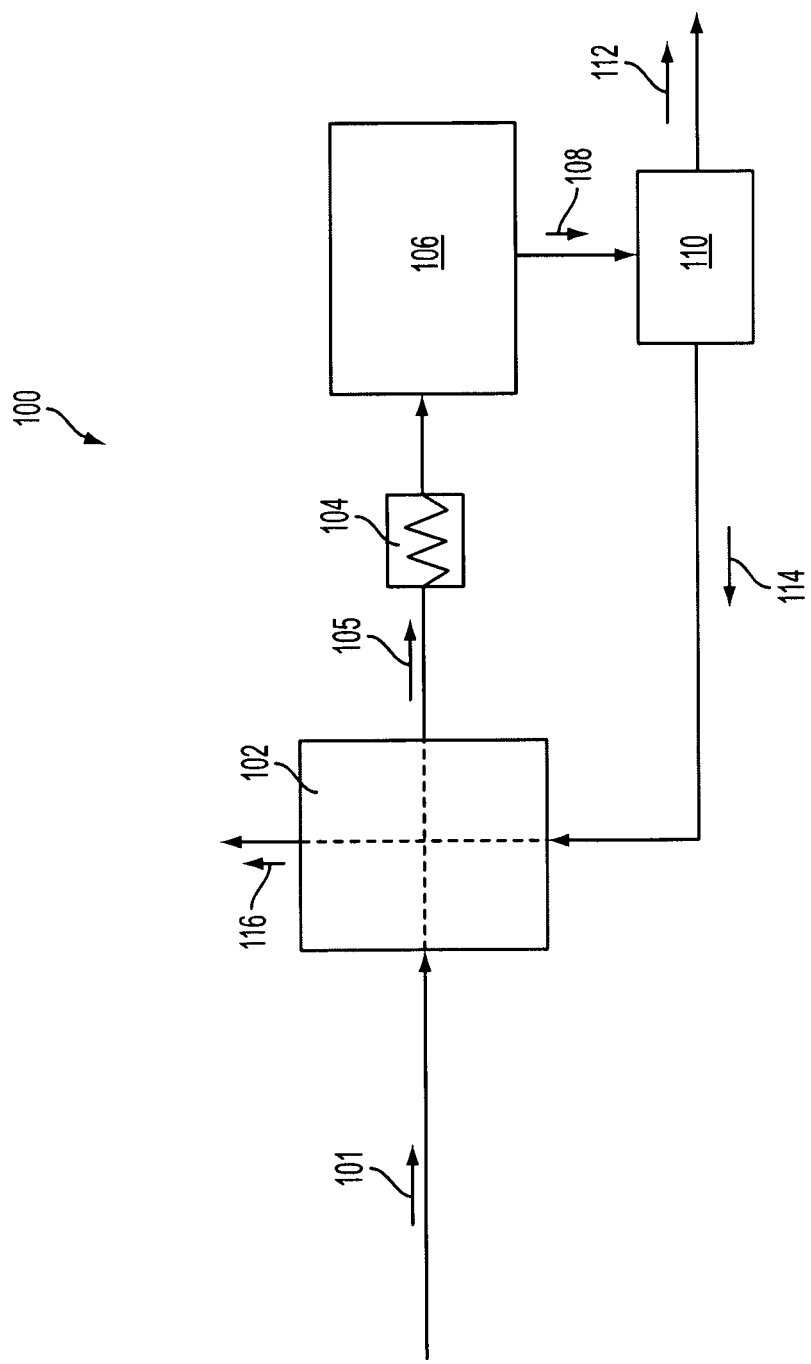
FIGS. 2 through 7 are simplified schematic views of solid carbon production systems including thermal energy recovery and conversion modifications, in accordance with embodiments of the disclosure.

One embodiment of the disclosure will now be described with reference to FIG. 2, which schematically illustrates a solid carbon production system 100. As shown in FIG. 2, the solid carbon production system 100 may include at least one heat exchanger 102, at least one heater 104, a reactor 106, and a separator 110. The heat exchanger 102 may receive a source gas stream 101 and may increase the temperature of the source gas stream 101 to form a heated source gas stream 105, which may be directed into the heater 104.

The source gas stream 101 may include at least one carbon oxide (e.g., carbon dioxide, carbon monoxide) and at least one gaseous reducing material. In at least some embodiments, the carbon oxide is a combination of carbon monoxide (CO) and carbon dioxide ($CO_2$). The carbon oxide may be obtained from the combustion of a primary hydrocarbon, may be obtained from the atmosphere (e.g., air), or may be obtained from some other source. The gaseous reducing material may include a known reducing material that may undergo a chemical reaction with the carbon oxide in the presence of at least one catalyst within the reactor 106 to form the at least one solid carbon material, as described in further detail below. As a non-limiting example, the gaseous reducing material may be a hydrocarbon gas (e.g., a lower hydrocarbon alkane, such as methane, ethane, propane, butane, pentane, hexane, etc.), an alcohol (e.g., ethanol), or hydrogen ($H_2$) gas. If utilized, hydrocarbon gas and/or alcohol may serve as both the gaseous reducing material and as a source of additional carbon material. In one or more embodiments, at least a portion of the source gas stream 101 may be synthesis gas ("syngas"). Syngas includes large amounts of CO and $H_2$, as well as small amounts of other materials, such as $CO_2$, and $N_2$. In at least some embodiments, the gaseous reducing material is a combination of methane ($CH_4$) and $H_2$. In additional embodiments, the gaseous reducing material and the carbon oxide may be provided to the heat exchanger 102 in separate streams (e.g., a reducing material stream, and a carbon oxide stream). The source gas stream 101 may have any desired ratio of the carbon oxide to the reducing material.

The heat exchanger 102 may be any suitable apparatus or device known in the art for exchanging heat from one fluid or gas to another fluid or gas. For example, the heat exchanger 102 may be a recuperative heat exchanger (e.g., a tube-in-tube heat exchanger, a shell-and-tube heat exchanger, etc.), that functions to heat the source gas stream 101 while cooling a hot side stream 114 (described below). The heated source gas stream 105 exiting the heat exchanger 102 may have a temperature up to an operating temperature of the reactor 106, such as a temperature within a range of from about 300° C. to about 1,000° C., such as from about 350° C. to about 800° C. The heated source gas stream 105 may have a pressure within a range of from about 25 pounds per square inch (psi) (i.e., about $1.72 \times 10^5$ pascal) to about 1,000 psi (i.e., about $6.90 \times 10^6$ pascal), such as about 35 psi (i.e., about $2.41 \times 10^5$ pascal) to about 600 psi (i.e., about $4.14 \times 10^6$ pascal), or from about 45 psi (i.e., about $3.10 \times 10^5$ pascal) to about 100 psi (i.e., about $6.9 \times 10^5$ pascal). In at least some embodiments, the heated source gas stream 105 exiting the heat exchanger 102 has a temperature of about 800° C. and a pressure of about 48 psi (i.e., about $3.31 \times 10^5$ pascal). In further embodiments, additional processing equipment (e.g., compressors, a mass flow controllers, gas analyzers, etc.) may be provided upstream of the heat exchanger 102 to control the pressure and flow rate of the source gas stream 101.

The heat exchanger 102 may also be configured and operated to substantially reduce or eliminate metal dusting therein. As used herein, the term "metal dusting" refers to a corrosion phenomenon wherein structures formed of and including pure metals and metal alloys degrade (e.g., breakup) into powder or "dust" at temperatures within a range of from about 450° C. to about 850° C. in gaseous environments including carbon. The heat exchanger 102 may, for example, be formed of and include at least one of a metal and a metal alloy exhibiting enhanced resistance to metal dusting, such as alloys of iron, chromium, and aluminum (FeCrAl alloys), and alloys of nickel, chromium, and aluminum. Suitable metals and metal alloys are commercially available from numerous sources, including, but not limited to Sandvik AB (Amherst, N.Y.), under the Kanthal APM tradename, Special Materials Corporation (Huntington, W. Va.), under the INCONEL® alloy 693 tradename. In some embodiments, at least a portion (e.g., portions interacting with one or more of the source gas stream 101, and the hot side stream 114) of the heat exchanger 102 is formed of and includes at least one of Kanthal APM and INCONEL® alloy 693. In additional embodiments, at least a portion (e.g., portions interacting with one or more of the source gas stream 101, and the hot side stream 114) of the heat exchanger 102 is formed of and includes a ceramic material.

The heater 104 may be a known device or apparatus configured and operated to increase the temperature of a gaseous material. By way of non-limiting example, the heater 104 may be at least one of a combustion heater, an electrical resistance heater, an inductive heater, and an electromagnetic heater. The heater 104 may receive the heated source gas stream 105 and may increase the temperature of the heated source gas stream 105 to a pre-determined set point. The pre-determined set point may depend on operating parameters of the reactor 106, as described in further detail below. For example, the pre-heater 104 may increase the temperature of the heated source gas stream 105 up to an operating temperature of the reactor 106, such as up to a temperature of about 1000° C. In yet further embodiments, such as where the heat exchanger 102 is sufficient to heat the source gas stream 101 up to an operating temperature of the reactor 106, the heater 104 may be omitted. In addition, similar to the heat exchanger 102, the heater 104 may be formed of and include at least one of a metal and a metal alloy exhibiting enhanced resistance to metal dusting. In some embodiments, at least a portion (e.g., portions interacting with the heated source gas stream 105) of the heater 102 is formed of and includes at least one of Kanthal APM and INCONEL® alloy 693.

The heated source gas stream 105 may exit the heater 104, and may be directed into the reactor 106. The reactor 106 may be any suitable device or apparatus configured and operated to form a reaction product stream 108 from components or reactants (e.g., the carbon oxide, and the gaseous reducing material) of the heated source gas stream 105. The reaction product stream 108 may include at least one solid carbon material (e.g., graphite, graphene, carbon black, soot, fibrous carbon, buckminsterfullerenes, single-wall CNTs, multi-walled CNTs, diamonds, etc.) and at least one additional material (e.g., one or more additional reaction products, such as water; unreacted components of the heat source gas stream 205, such as carbon dioxide, carbon monoxide, and hydrogen; a catalyst material; etc.).

For example, the reactor 106 may be configured and operated to form solid carbon and water ($H_2O$) from a Bosch reaction between $CO_2$ and $H_2$, according to the equation:

$$CO_2 + 2H_2 \leftrightarrow C_{(s)} + H_2O_{(g)} \tag{1}$$

The Bosch reaction may be exothermic. As a non-limiting example, if used to form CNTs, the Bosch reaction may facilitate a thermal energy output of about 24.9 kcal/mol at 650° C. (i.e., a heat of formation ($\Delta H$) of about −24.9 kcal/mol). As another non-limiting example, if used to form graphite, the Bosch reaction may facilitate a thermal energy output of about 23.8 kcal/mol at 650° C. (i.e., a $\Delta H$ of about −23.8 kcal/mol). As yet still another non-limiting example, if used to form buckminsterfullerenes, the Bosch reaction may facilitate a thermal energy output of about 13.6 kcal/mol at 650° C. (i.e., a $\Delta H$ of about −13.6 kcal/mol). The formation of carbon lamp black in the Bosch reaction is endothermic, consuming approximately 147.5 kcal/mol at 650° C. (i.e., $\Delta H$ is +147.5 kcal/mol). The formation of carbon lamp black in the Bosch reaction is endothermic, utilizing a thermal energy input of about 147.5 kcal/mol at 650° C. (i.e., a $\Delta H$ of about +147.5 kcal/mol). The Bosch reaction of Equation 1 may be broken up into two steps, according to the equations:

$$CO_2 + H_2 \leftrightarrow CO + H_2O \tag{2}$$

$$CO + H_2 \leftrightarrow C_{(s)} + H_2O \tag{3}$$

In the first step of the Bosch reaction, shown in Equation 2, $CO_2$ reacts with $H_2$ to create CO and $H_2O$ in an endothermic reaction. The endothermic reaction may utilize a thermal energy input of about 8.47 kcal/mol at 650° C. In the second step of the Bosch reaction, shown in Equation 3, CO reacts with $H_2$ to form solid carbon and $H_2O$ in an exothermic reaction. By way of non-limiting example, if used to form CNTs, the exothermic reaction may facilitate a thermal energy output of about 33.4 kcal/mol ($1.16 \times 10^4$ joules/gram of $C_{(s)}$) at 650° C. $\Delta H$ values for other solid carbon products (e.g., graphite, graphene, carbon black, fibrous carbon, buckminsterfullerenes, etc) may be determined by the difference between the $\Delta H$ value for Equation 1 for a particular solid carbon product and the $\Delta H$ value for Equation 2. The exothermic reaction may occur with stoichiometric amounts of reactants, or with an excess amount of one of $CO_2$ and $H_2$.

In some embodiments, the formation of solid carbon by way of the Bosch reaction may be augmented by a disproportionation of at least a portion of the CO into solid carbon and $CO_2$ by way of a Boudouard reaction (i.e., a reduction-oxidation reaction), according to the equation:

$$2CO \leftrightarrow CO_2 + C_{(s)} \tag{4}$$

The Boudouard reaction may be exothermic at temperatures less than or equal to about 700° C. As a non-limiting example, if used to form CNTs, the Boudouard reaction may facilitate a thermal energy output of about 41.9 kcal/mol at 650° C. (i.e., a heat of formation ($\Delta H$) of about −41.9 kcal/mol). As another non-limiting example, if used to form graphite, the Boudouard reaction may facilitate a thermal energy output of about 40.8 kcal/mol at 650° C. (i.e., a $\Delta H$ of about −40.8 kcal/mol). As yet still another non-limiting example, if used to form buckminsterfullerenes, the Boudouard reaction may facilitate a thermal energy output of about 30.5 kcal/mol at 650° C. (i.e., a $\Delta H$ of about −30.5 kcal/mol). At low temperatures, the Boudouard reaction may have a negative Gibbs free energy ($\Delta G$), and the production of solid carbon and $CO_2$ may be spontaneous. At higher temperatures, $\Delta G$ for the Boudouard Reaction may be positive, such that the reverse reaction is spontaneous. The temperature at which $\Delta G$ is zero (i.e., the temperature above which the reverse Boudouard reaction is spontaneous, and below which the forward Boudouard reaction is spontaneous) may depend on the form of carbon produced. As a non-limiting example, $\Delta G$ may equal zero at about 450° C. for buckminsterfullerenes, or at about 700° C. for CNTs. Accordingly, reaction conditions may be tailored to facilitate the forward Boudouard reaction (e.g., temperatures may be maintained below about 700° C.).

In additional embodiments, the reactor 106 may be configured and operated to form solid carbon and $H_2O$ from a reduction reaction between $CO_2$ and methane ($CH_4$), according to the equation:

$$CO_2 + CH_4 \leftrightarrow 2C_{(s)} + 2H_2O \tag{5}$$

Equation 5 may be exothermic, and may facilitate a thermal energy output of about 3.65 kcal/mol at standard conditions (25° C.). One or more of the reactions shown in Equations 1 through 5 above may occur in a reaction zone, for example, of the reactor 106.

The reactor 106 may include at least one catalyst material. As used herein, the term "catalyst material" means and includes any material catalyzing the formation of the solid carbon material from two or more components of the heated source gas stream 105. The catalyst material may accelerate a reaction rate of at least one of Equations 2, 3, 4, and 5. Faster reaction rates may enable the solid carbon material to have a smaller size (e.g., smaller diameter CNTs), while slower reaction rates may enable the solid carbon material to have larger size (e.g., larger diameter CNTs). The catalyst material may also enable the reactor 106 to be operated at lower temperatures. The catalyst material may be utilized with or without special preparation (e.g., acid washing).

As a non-limiting example, the catalyst material may comprise an element of Group 2 (e.g., beryllium, magnesium, calcium, strontium, barium), Group 3 (e.g., scandium, yttrium, lanthanide, actinide), Group 4 (e.g., titanium, zirconium, hafnium), Group 5 (e.g., vanadium, niobium, tantalum), Group 6 (e.g., chromium, molybdenum, tungsten), Group 7 (e.g., manganese, rhenium), Group 8 (e.g., iron, ruthenium, osmium), Group 9 (e.g., cobalt, rhodium, iridium), Group 10 (e.g., nickel, palladium, platinum), Group 11 (e.g., copper, silver, gold), Group 12 (e.g., zinc, cadmium), Group 13 (e.g., boron, aluminium, gallium, indium, thallium), Group 14 (e.g., silicon, germanium, tin, lead), or Group 15 (e.g., arsenic, anotimony, bismuth) of the Periodic Table of Elements, oxides thereof, carbides thereof, alloys thereof, or combinations thereof. The catalyst material may, for example, comprise a metal known to be subject to metal dusting. In some embodiments, the catalyst material comprises at least one element selected from Groups 5 through 10 of the Periodic Table of Elements.

Various grades of the catalyst material may be used. The catalyst material may, for example, be a grade of an iron-, chromium-, molybdenum-, cobalt-, tungsten-, or nickel-containing alloy or superalloy. Such materials commercially available from numerous sources, such as from Special Metals Corp., of New Hartford, N.Y., under the trade name INCONEL®, or from Haynes, Int'l, Inc., of Kokomo, Ind., under the trade name HASTELLOY® (e.g., HASTELLOY® B-2, HASTELLOY® B-3, HASTELLOY® C-4, HASTELLOY® C-2000, HASTELLOY® C-22, HASTELLOY® C-276, HASTELLOY® G-30, HASTELLOY® N, or HASTELLOY® W). Iron alloys, including steel, may contain various allotropes of iron, including alpha-iron (austenite), gamma iron, and delta-iron. In some embodiments, the catalyst material comprises an iron-containing alloy, wherein the iron is not in an alpha phase.

As a non-limiting example, the catalyst material may comprise at least one of a low chromium stainless steel, steel, and cast iron (e.g., white cast iron). The catalyst material may comprise less than or equal to about 22 percent by weight (wt %) chromium, and less than or equal to about 14 wt % nickel (e.g., such as less than or equal to about 8 wt % nickel). In some embodiments, the catalyst material comprises 316L stainless steel. 316L stainless steel comprises from about 16 wt % chromium to about 18.5 wt % chromium, and from about 10 wt % nickel to about 14 wt % nickel. 316L stainless steel may achieve relatively high reaction rates as compared to other types of stainless steel, such as 304 stainless steel. The use of 316L stainless steel may facilitate the formation of multiple morphologies of solid carbon (e.g., graphite, graphene, carbon black, soot, fibrous carbon, buckminsterfullerenes, single-wall CNTs, multi-walled CNTs, diamonds, etc.). Reaction conditions (e.g., temperature, pressure, etc.) may be controlled to form one or more desired morphologies of solid carbon. Grades of stainless steel exhibiting relatively lower solid carbon formation rates (e.g., a lower CNT formation rate), such as 304 stainless steel, may be utilized in the reactor 106 (and/or other components of solid carbon production system 100) for another purpose, such as a construction material of the reactor 106.

In some embodiments, the catalyst material may comprise an at least partially oxidized metal material (e.g., a rusted metal, such as rusted steel). The oxidized metal may be formed through a reduction reaction before and/or during the formation of the solid carbon through at least one of Equations 1, 4, and 5 above. Without being bound to a particular theory, it is believed that removal of oxides leaves voids or irregularities in a surface of the catalyst material, and increases the overall surface area of the catalyst material.

The catalyst material may be provided within the reactor 106 (e.g., within a reaction zone of the reactor 106) as at least one of a solid structure (e.g., a wafer, cylinder, plate, sheet, foil, powder, shot, grit, wool, chopped wool, sphere, pellet, fiber, etc.) and at least a partial coating on another structure (e.g., particles of the catalyst material deposited on an inert substrate structure, such as a wafer, cylinder, plate, sheet, foil, powder, shot, grit, wool, chopped wool, sphere, pellet, fiber, etc., within the reactor 106). The catalyst material may, optionally, be provided within the reactor 106 without the use of a solid support structure (e.g., a ceramic support structure, a metallic support structure, etc.). Providing the catalyst material within the reactor without the use of a solid support structure may, for example, simplify the setup of the reactor 106 and reduce costs.

In some embodiments, the catalyst material may be provided within the reactor 106 as a plurality of nanoparticles. As used herein, the term "nanoparticle" means and includes any particle having an average particle diameter of about 500 nm or less. Nanoparticles include grains of the catalyst material having an average grain size of about 500 nm or less. The nanoparticles of the catalyst material may be configured to increase the surface area of the catalyst material in contact with the carbon oxide and the reducing material as the reducing reaction (e.g., the Bosch reaction) proceeds. The catalyst material may be stationary (e.g., bound to at least one surface within the reactor 106) or mobile (unbound to surfaces within the reactor 106) within the reactor 106. In some embodiments, a portion of the catalyst material may be mobile within the reactor 106 and another portion of the catalyst material may be stationary with the reactor 106.

The catalyst material may, for example, be provided within the reactor 106 by introducing (e.g., injecting, spraying through a atomizing nozzle, electrostatic spraying, dispersing from a surface of a rotating fixture) a catalyst solution including the catalyst material and at least one solvent (e.g., water) into the reactor 106 (e.g., by way of an atomization nozzle), and heating the catalyst solution to evaporate the solvent and form the catalyst material. In additional embodiments, the catalyst material may be provided within the reactor 106 by way of decomposition of at least one catalyst precursor. The catalyst precursor may be selected such that a decomposition temperature of the catalyst precursor is below a temperature within the reactor 106.

Upon introduction to the reactor 106, the catalyst precursor may decompose to form the catalyst material. As a non-limiting example, the catalyst precursor may be dissolved in a solvent (e.g., water) to form a catalyst precursor solution. The catalyst precursor solution may supplied (e.g., sprayed into) into the reactor 106 and heated to the decomposition temperature to form the catalyst material. Forming the catalyst material in situ may control a size of the catalyst material (e.g., particles or grains of the catalyst material may be kept to a small and uniform size).

In yet additional embodiments, the catalyst material may be entrained in powder form in a carrier gas and introduced into the reactor 106. The powder may be formed from a pulverization and sieving process of the catalyst material, which may enhance a size uniformity of grains (e.g., nanoparticles) of the catalyst material. If desired, the catalyst material may be provided on at least one surface within the reactor 106 by sufficiently heating the surface such that the catalyst material bonds or couples thereto. The surface may be integral with the reactor 106 or may be distinct from the reactor 106. The surface may, for example, include surface of at least one structure (e.g., plate, cylinder, pellet, sphere, etc.) within the reactor 106. In one or more embodiments, the catalyst material may be formed on the surface within the reactor 106 by way of a vacuum deposition process at high negative pressures (e.g., from about $1.33 \times 10^{-4}$ pascal to about $1.33 \times 10^{-6}$ pascal) and high temperatures (e.g., from about 900° C. to about 1300° C.).

The composition, average grain size, and average grain boundary shape of the catalyst material may be tailored to achieve desired morphologies (e.g., shapes and sizes) of the solid carbon material. The solid carbon material (e.g., CNTs) may grow from grains of the catalyst material (e.g., the grains of the catalyst material may serve as nucleation sites). Morphologies of the solid carbon material may, therefore, be related to each of the average grain size and the average grain boundary shape of the catalyst material. A ratio between the grain size of the catalyst material and a diameter of a formed CNT may be within a range of from about 1.2 to about 1.6.

Without being bound to a particular theory, a possible theoretical basis for the correlation of catalyst material grain size and CNT diameter has been disclosed in Nasibulin et al., *Correlation between catalyst particle and single-walled carbon nanotube diameters*, 43 CARBON 2251-57 (2005). Smaller grain sizes of the catalyst material may produce smaller diameter CNTs. The average grain size the catalyst material may be a function of both the chemical characteristics of the catalyst material and the methodologies (e.g., thermal treatment methods) under which the catalyst material is formed on the one or more surfaces within the reactor 106.

The grains of the catalyst material may be monodisperse, wherein all of the grains are of substantially the same size, or may be polydisperse, wherein the grains have a range of sizes and are averaged. In addition, the grains of the catalyst material each have substantially the same grain boundary shape, or at least some of the grains of the catalyst material may have a substantially different grain boundary shape. A grain distribution of the catalyst material, including grain sizes and the grain boundary shapes, may be controlled by methods known in the art. For example, grain size may be controlled by controlling the nucleation of the catalyst material, such as by grain refinement or inoculation.

Inoculants for promoting nucleation may include titanium, boron, aluminum titanium ($Al_3Ti$), titanium diboride ($TiB_2$), etc. Nucleation of the catalyst material may also be promoted using pulsed laser light, such as by passing pulses through the catalyst (and through the catalyst precursor, if present). The use of pulsed laser light may enhance a grain size uniformity of the least one catalyst material.

A grain structure of the catalyst material may be modified by conventional methods, which are not described in detail herein. As a non-limiting example, the least one catalyst material may be heated to a temperature sufficient to recrystallize the least one catalyst material to form randomly oriented multiple grains. As used herein, the term "recrystallization" means and includes a process in which the catalyst material (e.g., a metal structure) may be plastically deformed, annealed, or otherwise heat-treated to affect grain growth of the least one catalyst material.

The catalyst material may also be annealed to change at least one of the grain boundary shape and the grain size of the catalyst material. As a non-limiting example, the catalyst material may be annealed by heating the catalyst material to a temperature above a recrystallization temperature thereof, maintaining the temperature for a period of time, then cooling the catalyst material. The size of the resulting grain structure may at least depend upon a recrystallization temperature of the catalyst material and an amount of time the catalyst material is exposed to a temperature greater than or equal to the recystallization temperature. In addition, a rapid cooling rate from the recrystallization temperature may facilitate increased maximum undercooling and increased nucleation sites, enabling smaller grain sizes of the catalyst material.

The catalyst material within the reactor 106 may be preconditioned prior to exposure to the heated source gas stream 105. By way of non-limiting example, the catalyst material may be heated in an inert carrier gas. Heating the catalyst material in an inert carrier gas may, for example, promote the growth of specific chiralities of single wall CNTs (e.g., helium is known to promote the growth of chiralities with metallic properties).

A wide variety of reactor configurations may facilitate the formation of the solid carbon material from the components of the heated source gas stream 105. The reactor 106 may be configured and operated as to increase the exposed surface area of the catalyst material to the carbon oxide and the reducing material. The reactor 106 may also be configured so as to enable the elutriation or sloughing off of the solid carbon material from the catalyst material, facilitating a substantially continuous operation of the reactor 106. The reactor 106 may be a batch reactor or may be a continuous reactor. By way of non-limiting example, the reactor 106 may be one of an aerosol reactor and a fluidized bed reactor.

If, for example, the reactor 106 is an aerosol reactor, the reactor 106 may be configured and operated such that the catalyst material described above is distributed within the reactor 106 in gas phase and/or such that the catalyst material is deposited on at least one surface within the reactor 106. Electrospraying may be an effective way to introduce the catalyst material into the aerosol reactor. Electrospraying may use coulombic forces to separate a catalyst material solution into small droplets from which individual particles of the catalyst material may form. Electrospraying may facilitate sustained particle separation and may also charge the subsequently formed solid carbon material such that the solid carbon material is easier to harvest (e.g., using a electrostatic precipitator). The distribution of the catalyst material within the aerosol reactor may facilitate both a growth the solid carbon material one the catalyst material and a subsequent transport of the solid carbon material from the reactor 106.

If, for example, the reactor 106 is a fluidized bed reactor, the reactor 106 may be configured and operated such that the catalyst material described above is distributed within the reactor 106 as particles of the catalyst material or as a coating of the catalyst material on other particles (e.g., steel spheres) within into the fluidized bed reactor. The solid carbon material may, for example, be grown on the catalyst material, elutriated in the fluidized bed reactor, and transported out of the fluidized bed reactor entrained in reaction gases. The fluidized bed reactor may retain the catalyst material while enabling the solid carbon material to be entrained in the reaction gas and to be lofted out of the fluidized bed reactor upon reaching a desired size (e.g. a desired CNT length). Such control may be achieved through at least one of the shape of the fluidized bed reactor and a control of gaseous flow rates through the fluidized bed reactor. In additional embodiments, the particles of the catalyst material and/or the other particles coated with the catalyst material may be removed from the fluidized bed reactor, and the solid carbon material may be subsequently removed from the catalyst material.

In one or more embodiments, particles within the fluidized bed reactor (e.g., particles of the catalyst material, or particles of another material coated with the catalyst material) may be of a substantially uniform diameter. The diameter of the particles may be selected based on at least one of the configuration of the fluidized bed reactor, the flow rate of gases through the reactor, and chemical properties (e.g., density) of one of more of the catalyst material, the components of the heated source gas stream 105, and any inert carrier gases utilized. The diameter of the particles may be chosen so as to prevent entrainment of the catalyst material with the reaction gases and also so as to avoid channeling of the components of the heated source gas stream 105 through the particles of the fluidized bed reactor. A diffuser or sparger may be employed through which the components of the heated source gas stream 105 may pass to provide a uniform flow pattern through the particles to assist in preventing channeling through the particles.

When using a solid structure of the catalyst material, such as a solid wafer of the catalyst material, the solid carbon material may grow in a series of generations. By way of non-limiting example, CNTs may form clumps, pillows, forests, fibers, piles, etc., as described in U.S. patent application Ser. No. 13/263,311, entitled "Method for Producing Solid Carbon by Reducing Carbon Oxides," previously incorporated herein in its entirety by reference. In addition, when the catalyst material is coated on an object of manufacture (i.e., another structure), an entire surface of the object of manufacture need not be uniformly covered by with the solid carbon material. For example, formation of the solid carbon material may be limited to one or more regions along the surface of the object of manufacture by masking, or by selectively depositing the at least on catalyst material on object of manufacture to promote the formation of the solid carbon material select locations along the surface of the object of manufacture.

The physical properties of the solid carbon material formed by the reaction of the carbon oxide and the reducing material in the presence of the catalyst material may, optionally, be modified prior to removing the solid carbon material from the reactor 106. By way of non-limiting example, if desired, at least one modifying agent (e.g., ammonia, thiophene, nitrogen gas, and/or surplus hydrogen) may be introduced to the reactor 106 during the formation of the solid carbon material to modify the physical properties of the solid carbon material. For example, surplus hydrogen may result in the hydrogenation of the solid carbon material, resulting in a significant yield of semiconductor species of the solid carbon material. In addition, small amounts of other modifying agents (e.g., sulfur) may serve as catalyst promoters that accelerate the growth of the solid carbon material on the catalyst material. Such catalyst promoters may be introduced into the reactor 106 using a variety of compounds.

For example, if sulfur is selected as a catalyst promoter for an iron-based catalyst material, the sulfur may be introduced into the reactor 106 as a thiophene gas, or as thiophene droplets. Examples of sulfur-containing catalyst promoters include thiophene, hydrogen sulfide, heterocyclic sulfide, and inorganic sulfide. Other promoters include lead compounds and bismuth. The modifying agent may, for example, be introduced into the reactor 106 by delivering a separate stream (not shown) containing the modifying agent into the reactor 106. The modifying agent may also be introduced into the reactor 106 as a component of the heated source gas stream 105.

An operating temperature of reactor 106 may at least partially depend on the composition of the catalyst material and the average grain size of the catalyst material. For example, catalyst materials having small particle sizes generally exhibit optimum reaction temperatures at lower temperatures than the same catalyst materials having larger particle sizes. As a non-limiting example, the Bosch reaction may occur at temperatures within a range of from about 400° C. to about 800° C. for iron-based catalysts, depending on the grain size and composition of the iron-based catalyst used, and the desired form of the solid carbon material. In general, graphite and amorphous solid carbon form at lower temperatures, and CNTs form at higher temperatures. CNTs may form at temperatures above about 680° C. In at least some embodiments, the operating temperature of the reactor 106 is greater than or equal to about 650° C.

The reactor 106 may be maintained at a desired operating temperature by of the temperature of the heated source gas stream 105 entering the reactor 106 and one or more integrated heating devices (e.g., a flame ignited heater, an electrical resistance heater, an inductive heater, an electromagnetic heater, etc.). The heat exchanger 102 and the heater 104 may reduce the heating load necessary to maintain the reactor 106 at a selected operating temperature. In general, the reduction reaction to form the solid carbon material may proceed at a wide range of pressures, such as with of range from about 14 psi (i.e., about $1\times10^5$ pascal) to about $1.45\times10^5$ psi (i.e., about $1\times10^9$ pascal), or from about 14 psi (i.e., about $1\times10^5$ pascal) to about 600 psi (i.e., about $4.14\times10^6$ pascal). Increasing the pressure may increase the reaction rate. A residence time within the reactor 106 may be within a range of from about $1\times10^{-4}$ seconds to about $1\times10^4$ seconds, such as from about $1\times10^{-3}$ seconds to about 1000 seconds, or from about 0.01 seconds to about 500 second. The residence time in the reactor 106 may be at least partially controlled by one or more forces (e.g., gravitational forces, electromagnetic forces, centrifugal forces, etc.).

With continued reference to FIG. 2, the reaction product stream 108 including the solid carbon material (e.g., graphite, graphene, carbon black, fibrous carbon, buckminsterfullerenes, single-wall CNTs, multi-walled CNTs, etc.), may exit the reactor 106 and may be directed into the separator 110. The separator 110 may be any known device or apparatus configured and operated to separate or remove the solid carbon material of the reaction product stream 108 from the additional materials (e.g., gaseous $H_2O$, $CO_2$, CO, $H_2$) of the reaction product stream 108. The separator 110 utilized to remove the solid carbon material from reaction product stream 108 may depend on the configuration of the reactor 106. By way of non-limiting example, if the reactor 106 is an aerosol reactor or a fluidized bed reactor, the separator 110 may be at least one of an electrostatic precipitator, thermophoretic collector, a centrifugation device, and a filtration device. In addition, similar to the heat exchanger 102 and the heater 104, the separator 110 may be formed of and include at least one of a metal and a metal alloy exhibiting enhanced resistance to metal dusting. In some embodiments, at least a portion (e.g., portions interacting with reaction product stream 108) of the separator 110 is formed of and includes at least one of Kanthal APM and INCONEL® alloy 693.

In additional embodiments, at least one of water and steam may, optionally, be introduced into the reaction product stream 108 before directing the reaction product stream 108 into the separator 110. Introducing the at least one of water and steam into the reaction product stream 108 may cool the reaction product stream 108 and may reduce carbon activity so as to substantially reduce or eliminate metal dusting in the separator 110 and in components downstream of the separator (e.g., the heat exchanger 102, the heater 104, etc.).

If the reaction product stream 108 includes the catalyst material (e.g., a solid structure of the catalyst material, particles of the catalyst material on another structure, or a combination thereof), the solid carbon material may be removed from (e.g., abraded, rinsed off) surfaces of the catalyst material. In at least some embodiments, the separator 110 is a cyclone separator. The solid carbon material may be removed from the reaction product stream 108 prior to substantial cooling. Removing the carbon material from the reaction product stream 108 prior to cooling may reduce the deposit or growth of undesirable morphologies on the carbon material. In additional embodiments, the reaction product stream 108 may pass through at least one heat exchanger (not shown) to recapture thermal energy prior to delivery into the separator 110. The solid carbon material may exit the separator 110 as solid carbon product stream 112, and may be utilized as desired.

The additional materials may exit the separator 110 as hot side stream 114, and may be directed into the heat exchanger 102. As described above, within the heat exchanger 102 the hot side stream 114 may transfer heat to the source gas stream 101 to form the heated source gas stream 105. A cooled side stream 116 including liquid $H_2O$ and one or more of the additional materials (e.g., gaseous $H_2O$, $CO_2$, CO, $H_2$) may exit the heat exchanger 102, and may be utilized or disposed of as desired. In some embodiments, at least a portion of at least one of the cooled side stream 116 and the hot side stream 114 may be recycled into at least one of the source gas stream 101, the heated source gas stream 105, and the reactor 106. Recycling at least a portion of at least one of the cooled side stream 116 and the hot side stream 114 may, for example, be used to control partial pressure of water within the reactor 106.

The partial pressure of water within the reactor 106 may be controlled to form solid carbon of a desired morphology (e.g., graphite, graphene, carbon black, soot, fibrous carbon, buckminsterfullerenes, single-wall CNTs, multi-walled CNTs, diamonds, etc.) within the reactor 106, and to control the kinetics of solid carbon formation. For example, changing the partial pressure of water within the reactor 106 may change carbon activity ($A_c$) within the reactor 106. Without being bound to any particular theory, carbon activity ($A_c$) is believed to be a metric for determining which allotrope of solid carbon will be formed under particular reaction conditions (e.g., temperature, pressure, reactants, concentrations). For example, higher carbon activity may result in the formation of CNTs, and lower carbon activity may result in the formation of graphitic forms of solid carbon. Carbon activity for a reaction forming solid carbon from gaseous reactants can be defined as the reaction equilibrium constant times the partial pressure of gaseous products, divided by the partial pressure of reactants. For example, in the reaction, $CO_{(g)}+H_{2(g)} \leftrightarrows C_{(s)}+H_2O_{(g)}$, with a reaction equilibrium constant of K, the carbon activity $A_c$ is defined as $K \cdot (P_{CO} \cdot P_{H2}/P_{H2O})$. Thus, $A_c$ is directly proportional to the partial pressures of CO and $H_2$, and inversely proportional to the partial pressure of $H_2O$. Higher $P_{H2O}$ may inhibit CNT formation. The carbon activity of this reaction may also be expressed in terms of mole fractions and total pressure: $A_c = K \cdot P_T (Y_{CO} \cdot Y_{H2}/Y_{H2O})$, where $P_T$ is the total pressure and Y is the mole fraction of a species. Carbon activity may vary with temperature because reaction equilibrium constants vary generally with temperature. Carbon activity also varies with total pressure for reactions in which a different number of moles of gas are produced than are consumed. Mixtures of solid carbon allotropes and morphologies thereof can be achieved by varying the catalyst material and the carbon activity of the reaction gases in the reactor 106.

In additional embodiments, at least one additional heat exchanger (e.g., condenser) may be provided downstream of the heat exchanger 102 to further control the temperature of the cooled side stream 116 (e.g., to condense any remaining gaseous $H_2O$ in the cooled side stream 116 into liquid $H_2O$). In additional embodiments, at least one flow control device (not shown) may be positioned proximate at least one of an inlet and an outlet of the heat exchanger 102 to control a flow rate of at least one of the hot side stream 114 and the source gas stream 101 and to regulate heat exchange rates thereof. Delivering the hot side stream 114 into the heat exchanger 102 facilitates the recovery of thermal energy input into (e.g., by way of the heated source gas stream 105 and/or the one or more integrated heating devices) and generated within (e.g., by way of one of more of the exothermic reducing reactions of Equations 3, 4, and 5 described above) the reactor 106, increasing process efficiency and/or reducing operational costs. In further embodiments, the hot side stream 114 may be passed through at least one filtration unit (not shown), such as a high temperature (e.g., ceramic) filter, to substantially reduce any particulate levels in the hot side stream 114 prior to delivery into the heat exchanger 102.

Figure 3:
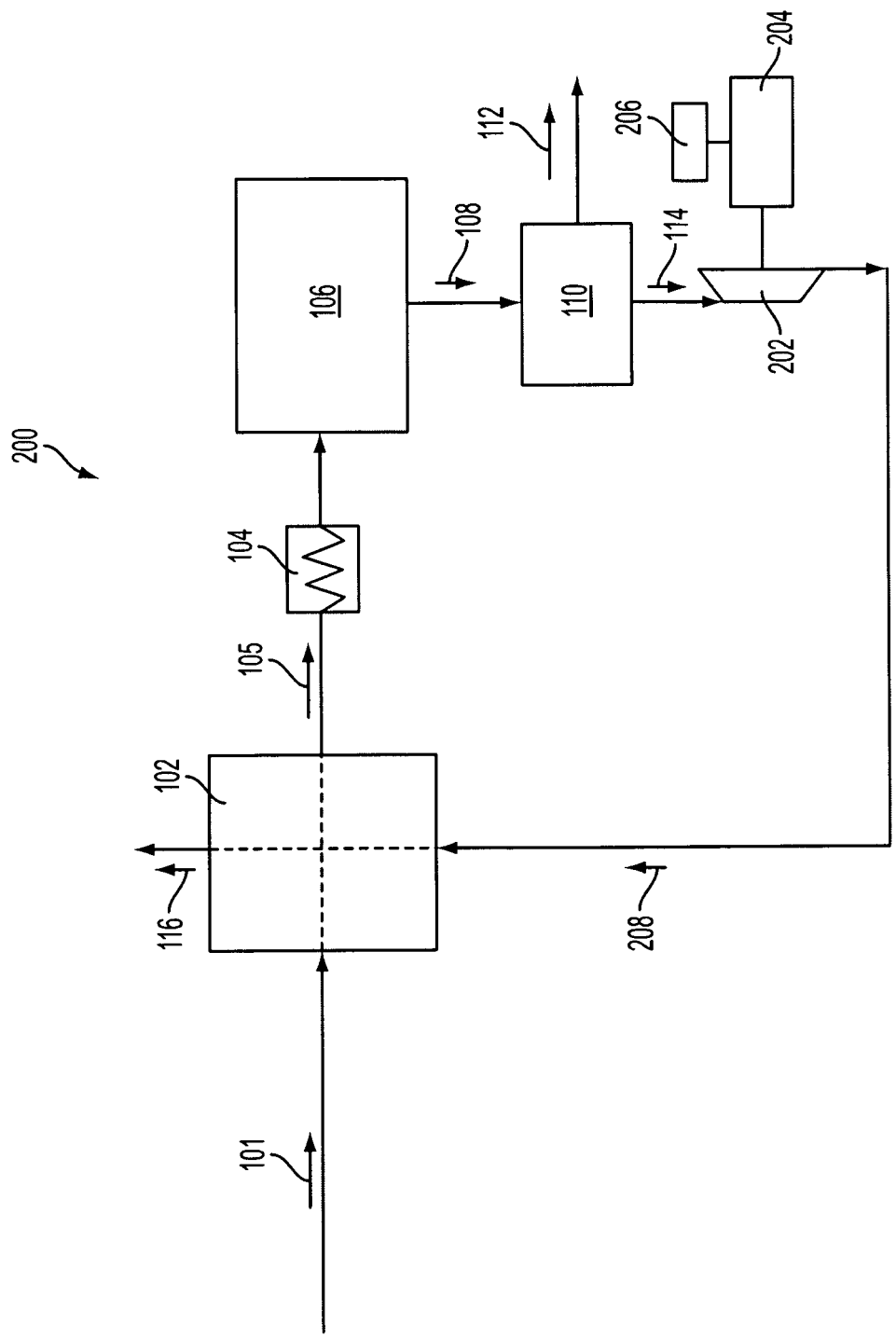

Another embodiment of the disclosure will now be described with reference to FIG. 3, which schematically illustrates a solid carbon production system 200. The solid carbon production system 200 of FIG. 3 is similar to the solid carbon production system 100 of FIG. 2, but includes heat-recovery modifications that may increase process efficiency and/or reduce operational costs. As shown in FIG. 3, the hot side stream 114 (described above with reference to FIG. 2) may exit the separator 110 and may be directed into an expansion turbine 202. In additional embodiments, such as where the hot side stream 114 includes solid material (e.g., suspended particles) the hot side stream 114 may be passed through at least one additional separation device (not shown), such as a high temperature (e.g., ceramic) filter, prior to being delivered into the expansion turbine 202.

The expansion turbine 202 (e.g., steam turbine) may use the hot side stream 114 to produce work (i.e., mechanical power) to drive a generator 204. Electrical power generated by the generator 204 may be coupled to a power bus 206. The electrical power from the power bus 206 may be utilized as desired, such as to at least partially power one or more devices or apparatuses (e.g., various pumps, various compressors, the reactor 106, the heater 104 if the heater 104 is an electrical heater, etc.) of the solid carbon production system 200. In additional embodiments, the expansion turbine 202 may be mechanically coupled to directly drive at least one other device or apparatus of the solid carbon production system 200 (e.g., at least one pump, at least one compressor, etc.).

Expansion turbine exhaust 208 may exit the expansion turbine 202 and may be directed into the heat exchanger 102. Within the heat exchanger 102, the expansion turbine exhaust 208 may transfer heat to the source gas stream 101 to form the cooled side stream 116 and the heated source gas stream 105. In additional embodiments, at least one flow control device (not shown) may be positioned proximate at least one of an inlet and an outlet of the heat exchanger 102 to control a flow rate of at least one of the expansion turbine exhaust 208 and the source gas stream 101 and to regulate heat exchange rates thereof. In additional embodiments, such as where generated electrical power delivered to the heater 104 from the power bus 206 is sufficient to enable the heater 104 to increase the temperature of the source gas stream to a predetermined temperature, the heat exchanger 102 may be omitted.

Figure 4:
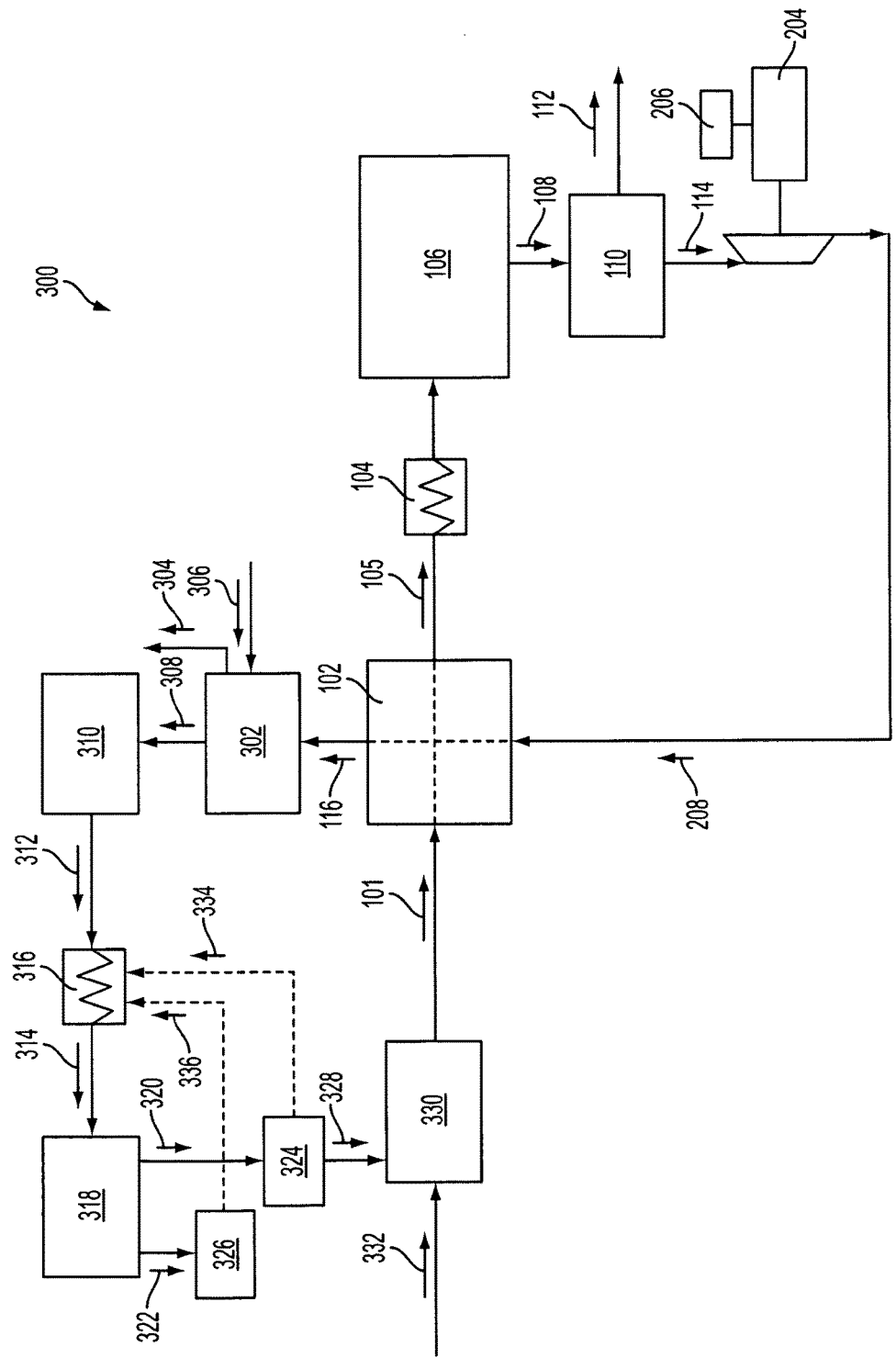

Another embodiment of the disclosure will now be described with reference to FIG. 4, which schematically illustrates a solid carbon production system 300. The solid carbon production system 300 of FIG. 4 is similar to the solid carbon production system 200 of FIG. 3, but includes additional modifications that may increase process efficiency and/or reduce operational costs. As shown in FIG. 4, the cooled side stream 116, which may comprise liquid $H_2O$ and various gaseous components (e.g., $CO_2$, CO, $H_2$, gaseous $H_2O$, $CH_4$), may exit the heat exchanger 102 and may be directed into a storage vessel 302. The storage vessel 302 may vent any gaseous components (e.g., $CO_2$, CO, $H_2$, gaseous $H_2O$, $CH_4$) as offgas 304. In additional embodiments, gaseous components of the cooled side stream 116 may be vented before the cooled side stream 116 is delivered into the storage vessel 302. In yet additional embodiments, any gaseous components of the cooled side stream 116 may be recirculated into the solid carbon production system 300 (e.g., delivered into at least one of an external source gas stream 332, the source gas stream 101, and the heated source gas stream 105). If desired, additional liquid $H_2O$ may be provided to the storage vessel 302 as source water stream 306. A water stream 308 may exit the storage vessel 302 and may be delivered to (e.g., pumped to) a deionizer 310. The deionizer 310 may deionize the water stream 308 to produce deionized water 312. At least one filtration device (e.g., a reverse osmosis device) may be utilized to ensure that substantially no solid carbon particulates enter the deionizer 310. In additional embodiments, the deionizer 310 may be omitted.

The deionized water 312 may exit the deionizer 310 and may, optionally, be directed into at least one pre-heater 316. The optional pre-heater 316 (e.g., a combustion heater, an electrical resistance heater, an inductive heater, an electromagnetic heater, etc.) may increase the temperature of the deionized water 312 to a predetermined temperature based on a desired operating temperature of an electrolyzer 318. Increasing the temperature of the deionized water 312 may decrease the electrical load requirements of the electrolyzer 318. If a combustion heater is used as the optional pre-heater 316, fuel (e.g., $H_2$, $O_2$) for the preheater may be provided by the subsequent electrolysis of water, as described in further detail below. If an electrical resistance heater is used as the optional pre-heater 316, the electrical power to run the electric heater may be at least partially supplied from the power bus 206. A heated deionized water stream 314 (or the deionized water 312 if the pre-heater 316 is omitted, or the water stream 308 if both the deionizer 310 and the pre-heater 316 are omitted) may be directed out of the pre-heater 316 and into the electrolyzer 318.

The electrolyzer 318 may regenerate the heated deionized water stream 314 into a hydrogen gas stream 320 and an oxygen gas stream 322. The hydrogen gas stream 320 may exit the electrolyzer 318 and may be compressed and delivered into a hydrogen storage vessel 324. The hydrogen storage vessel 324 may be any storage vessel configured and operated to store a desired amount of hydrogen and sustain a desired pressure, such as a pressure greater than that of the mixer 330. The oxygen gas stream 322 may exit the electrolyzer 318 and may, optionally, be compressed and delivered into an oxygen storage vessel 326. The oxygen storage vessel 326 may be any storage vessel configured and operated to store a desired amount of oxygen and sustain a desired pressure. In additional embodiments, the hydrogen gas stream 320 and the oxygen gas stream 322 may be delivered into a single storage vessel (not shown). The electrical power to run at least one of the electrolyzer 318 and at least one compressor (not shown) used to compress one or more of the hydrogen gas stream 320 and the oxygen gas stream 322 may be at least partially supplied from the power bus 206.

Hydrogen in the hydrogen storage vessel 324 and oxygen in the oxygen storage vessel 144 may be utilized as desired. By way of non-limiting example, at least a portion of the hydrogen in the hydrogen storage vessel 324 may be used as a reducing material in the source gas stream 101. For instance, as depicted in FIG. 4, an effluent hydrogen gas stream 328 may exit the hydrogen storage vessel 324 and may be delivered into a mixer 330. Within the mixer 330, the effluent hydrogen gas stream 328 may mix or combine with the external source gas stream 332 to form the source gas stream 101 previously described herein with reference to FIG. 2. The external source gas stream 332 may include at least one carbon oxide (e.g., $CO_2$, CO) and may, optionally, include at least one reducing material (e.g., $H_2$; gaseous hydrocarbons, such as $CH_4$; etc.). The effluent hydrogen gas stream 328 may, therefore, serve as a single source of the reducing material of the source gas stream 101, or may serve as an additional source of the reducing material of the source gas stream 101.

In yet additional embodiments, at least one of the hydrogen in the hydrogen storage vessel 324 and the oxygen in the oxygen storage vessel 326 may be utilized to heat at least one stream of the solid carbon production system 300. By way of non-limiting example, as shown in FIG. 4, if the pre-heater 316 is a combustion heater, at least one of hydrogen 334 from the hydrogen storage vessel 324 and oxygen 336 from the oxygen storage vessel 326 may be received into the pre-heater 316 and undergo an combustion reaction to efficiently heat the deionized water 312 and form the heated deionized water stream 314. The product of the combustion reaction is $H_2O$, which may be recycled into the solid carbon production system 300 (e.g. directed into the electrolyzer 318) without the need for an additional heat exchanger. At least one of the hydrogen in the hydrogen storage vessel 324 and the oxygen in the oxygen storage vessel 326 may be used in a similar manner to further heat the heated source gas stream 105 (e.g., by way of the heater 104) before the heated source gas stream 105 is delivered into the reactor 106. Utilizing the at least one of the hydrogen in the hydrogen storage vessel 324 and the oxygen in the oxygen storage vessel 326 as described above advantageously reduces the electrical power requirements of the solid carbon production system 300 by enabling the utilization of direct thermal energy.

Figure 5:
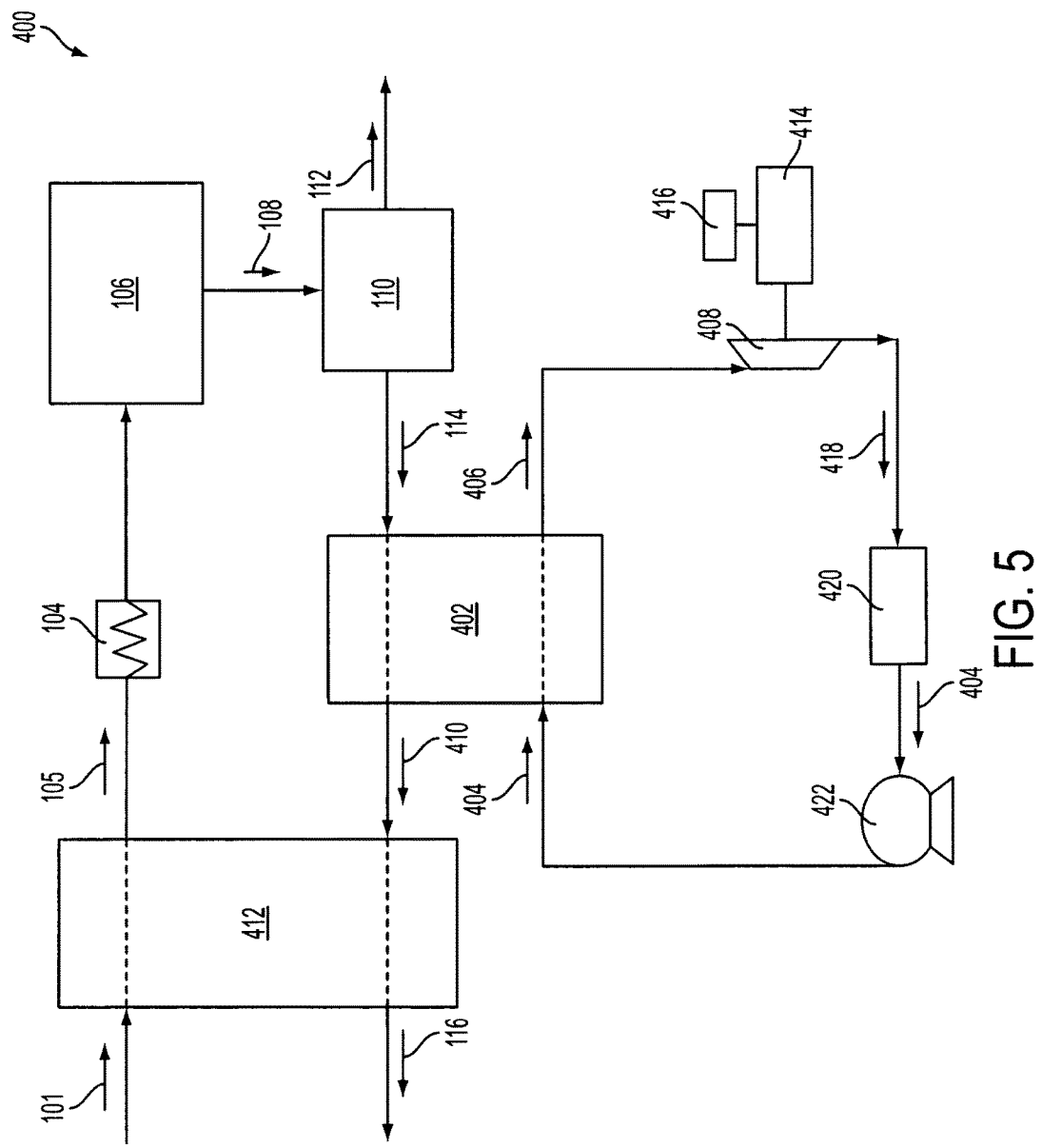

Another embodiment of the disclosure will now be described with reference to FIG. 5, which schematically illustrates a solid carbon production system 400. The solid carbon production system 400 of FIG. 5 is similar to the solid carbon production system 100 of FIG. 2, but includes additional heat-recovery modifications that may increase process efficiency and/or reduce operational costs. As shown in FIG. 5, the hot side stream 114, which may include gaseous $H_2O$ and one or more additional materials (e.g., CO, $CO_2$, $H_2$, $CH_4$, other reducing materials, etc.), may exit the separator 110 and may be directed into a first heat exchanger 402. In additional embodiments, such as Where the hot side stream 114 includes solid material (e.g., suspended particles of the catalyst material) the hot side stream 114 may be passed through at least one additional separation device (not shown), such as a high temperature (e.g., ceramic) filter, prior to being delivered into the first heat exchanger 402.

The first heat exchanger 402 may be any suitable apparatus or device known in the art for exchanging heat from one fluid or gas to another fluid. By way of non-limiting example, the first heat exchanger 402 may be a recuperative heat exchanger (e.g., a shell-and-tube heat exchanger) that functions to cool the hot side stream 114 while vaporizing exchange fluid 404 to produce high-pressure vapor 406. The exchange fluid 404 may be selected such that heat is efficiently recovered from the hot side stream 114, and the expansion turbine 408 may be operated efficiently.

In at least some embodiments, the exchange fluid 404 is liquid $H_2O$ (i.e., water), and the high-pressure vapor 406 is high-pressure gaseous $H_2O$ (i.e., high-pressure steam). The high-pressure vapor 406 exiting an outlet of the first heat exchanger 402 may have a temperature of greater than or equal to about 300° C. The high-pressure vapor 406 may be delivered into the expansion turbine 408, as described below. In additional embodiments, the exchange fluid 404 may remain in a substantially liquid phase (e.g., as a hot, high pressure exchange fluid) following heating in the first heat exchanger 402, and may flash into the high-pressure vapor 406 upon delivery into the expansion turbine 408. An exchange fluid cooled side stream 410 may exit another outlet of the first heat exchanger 402 and may be directed into second heat exchanger 412. In additional embodiments, such as where the exchange fluid cooled side stream 410 includes solid material (e.g., suspended particles of the catalyst material), the the exchange fluid cooled side stream 410 may be passed through at least one additional separation device, prior to being delivered into the second heat exchanger 412.

The second heat exchanger 412 may be substantially similar to the heat exchanger 102 described above in reference to FIG. 2. The second heat exchanger 412 may transfer heat from the exchange fluid cooled stream 410 to the source gas stream 101 to form the cooled side stream 116 and the heated source gas stream 105. In additional embodiments, at least one flow control device (not shown) may be positioned proximate at least one of an inlet and an outlet of the first heat exchanger 412 to control a flow rate of at least one of the exchange fluid cooled stream 410 and the source gas stream 101 and to regulate heat exchange rates thereof.

The expansion turbine 408 (e.g., steam turbine) may receive the high-pressure vapor 406 from the first heat exchanger 402 and may use the high-pressure vapor 406 to produce work (i.e., mechanical power) to drive a generator 414. Electrical power generated by the generator 414 may be coupled to a power bus 416. The electrical power from the power bus 416 may be utilized as desired, such as to at least partially power one or more devices or apparatuses (e.g., various pumps, various compressors, the reactor 106, the heater 104 if the heater 104 is an electrical resistance heater, etc.) of the solid carbon production system 400. In additional embodiments, the expansion turbine 408 may be mechanically coupled to directly drive at least one other device or apparatus of the solid carbon production system 400 (e.g., at least one pump, at least one compressor, etc.). An expansion turbine exhaust 418 may be condensed in at least one condenser 420 to again form the exchange fluid 404. The exchange fluid 404 may be pressurized in pump 422 and may be directed into the first heat exchanger 402 to facilitate additional thermal energy recovery. A composition of the exchange fluid 404 may, optionally, be modified in response to changes in at least one of the temperature of the hot side stream 114 and the temperature of expansion turbine exhaust 418 (e.g., to sustain the heat-recovery efficiency of the solid carbon production system 400).

Figure 6:
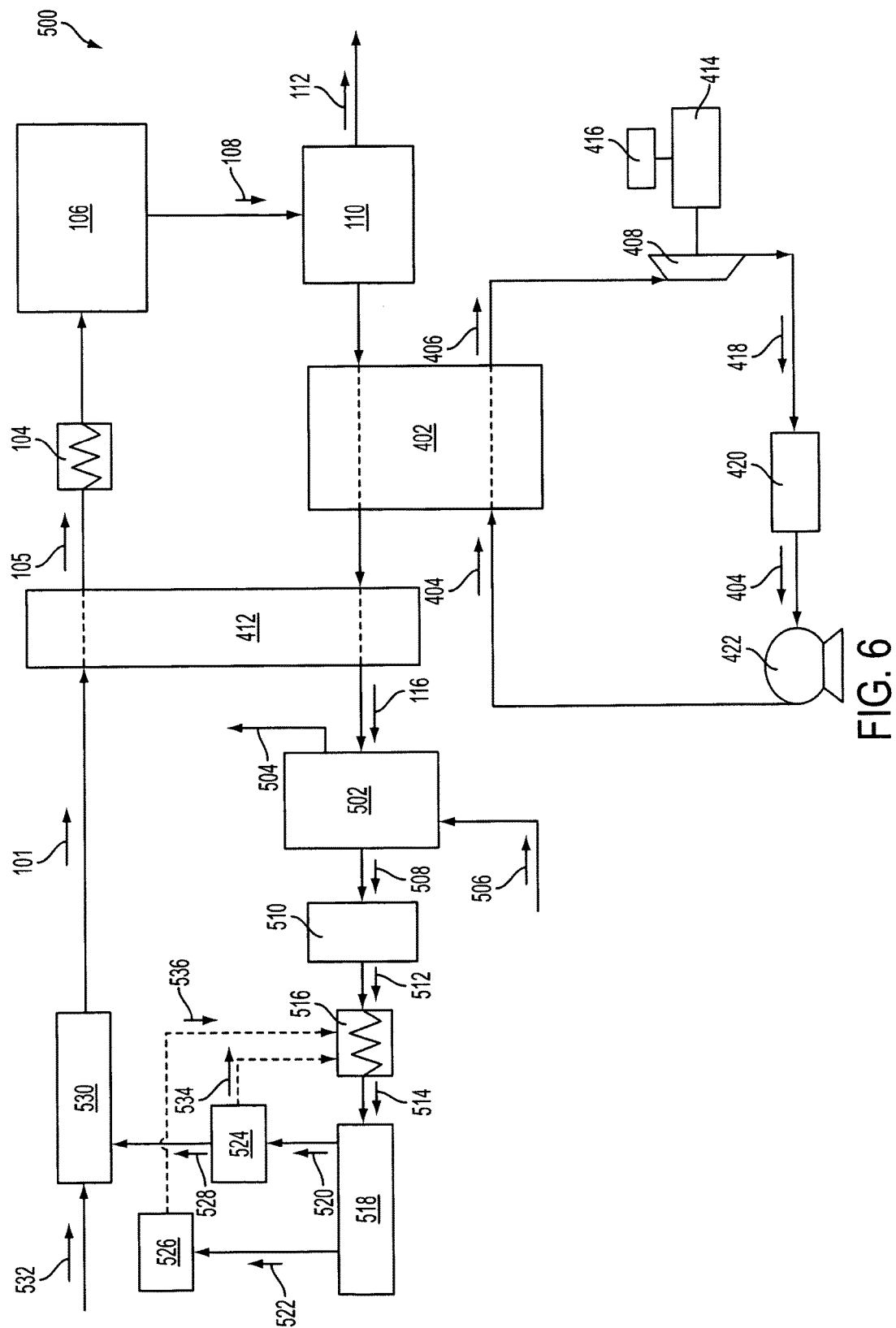

Another embodiment of the disclosure will now be described with reference to FIG. 6, which schematically illustrates a solid carbon production system 500. The solid carbon production system 500 of FIG. 6 is similar to the solid carbon production system 400 of FIG. 5, but includes additional modifications that may increase process efficiency and/or reduce operational costs. As shown in FIG. 6, the cooled side stream 116 may exit the heat exchanger 102 and may be directed into a storage vessel 502. The storage vessel 502 may vent any gaseous components (e.g., $CO_2$, CO, $H_2$, gaseous $H_2O$, $CH_4$) as offgas 504. In additional embodiments, any gaseous components of the cooled side stream 116 may be vented before the cooled side stream is delivered into the storage vessel 502. In yet additional embodiments, any gaseous components of the cooled side stream 116 may be recirculated into the solid carbon production system 400 (e.g., delivered into at least one of a external source gas stream 532, the source gas stream 101, and the heated source gas stream 105). If desired, additional liquid $H_2O$ may be provided to the storage vessel 502 as source water stream 506. A water stream 508 may exit the storage vessel 502 and may be delivered to (e.g., pumped to) a deionizer 510. The deionizer 510 may deionize the water stream 508 to produce deionized water 512. In additional embodiments, the deionizer 510 may be omitted.

The deionized water 512 exits the deionizer 510 and may, optionally, be directed into at least one pre-heater 516. The optional pre-heater 516 (e.g., a combustion heater, an electrical resistance heater, an inductive heater, an electromagnetic heater, etc.) may increase the temperature of the deionized water 512 to a predetermined temperature based on a desired operating temperature of an electrolyzer 518. Increasing the temperature of the deionized water 512 may decrease the electrical load requirements of the electrolyzer 518.

If a combustion heater is used as the optional pre-heater 516, at least a portion of the fuel and oxygen (e.g., $H_2$, $O_2$) for the preheater may be provided by the subsequent electrolysis of water, as described in further detail below. If an electrical resistance heater is used as the optional pre-heater 516, the electrical power to run the electric heater may be at least partially supplied from the power bus 416. A heated deionized water stream 514 (or the deionized water 512 if the pre-heater 516 is omitted, or the water stream 508 if both the deionizer 510 and the pre-heater 516 are omitted) may be directed out of the pre-heater 516 and into the electrolyzer 518.

The electrolyzer 518 may regenerate the heated deionized water stream 514 into a hydrogen gas stream 520 and an oxygen gas stream 522. The hydrogen gas stream 520 may exit the electrolyzer 518 and may be compressed and delivered into a hydrogen storage vessel 524. The hydrogen storage vessel 524 may be any storage vessel configured and operated to store a desired amount of hydrogen and sustain a desired pressure. The oxygen gas stream 522 may exit the electrolyzer 518 and may, optionally, be compressed and delivered into an oxygen storage vessel 526. The oxygen storage vessel 526 may be any storage vessel configured and operated to store a desired amount of oxygen and sustain a desired pressure. In additional embodiments, the hydrogen gas stream 520 and the oxygen gas stream 522 may be delivered into a single storage vessel (not shown). The electrical power to run at least one of the electrolyzer 518 and at least one compressor (not shown) used to compress one or more of the hydrogen gas stream 520 and the oxygen gas stream 522 may be at least partially supplied from the power bus 416.

Hydrogen in the hydrogen storage vessel 524 and oxygen in the oxygen storage vessel 544 may be utilized as desired. By way of non-limiting example, at least a portion of the hydrogen in the hydrogen storage vessel 524 may be used as a reducing material in the source gas stream 101. For instance, as depicted in FIG. 6, an effluent hydrogen gas stream 528 may exit the hydrogen storage vessel 524 and may be delivered into a mixer 530. Within the mixer 530, the effluent hydrogen gas stream 528 may mix or combine with an external source gas stream 532 to form the source gas stream 101 previously described herein with reference to FIG. 2. The external source gas stream 532 may include at least one carbon oxide (e.g., $CO_2$, CO) and may, optionally, include at least one reducing material (e.g., $H_2$; gaseous hydrocarbons, such as $CH_4$; etc.). The effluent hydrogen gas stream 528 may, therefore, serve as a single source of the reducing material of the source gas stream 101, or may serve as an additional source of the reducing material of the source gas stream 101. In some embodiments, at least a portion of the effluent hydrogen gas stream 528 may be diverted for use in at least one other application.

In yet additional embodiments, at least one of the hydrogen in the hydrogen storage vessel 524 and the oxygen in the oxygen storage vessel 526 may be utilized to heat at least one stream of the solid carbon production system 500. By way of non-limiting example, as shown in FIG. 6, if the pre-heater 516 is a combustion heater, at least one of hydrogen 534 from the hydrogen storage vessel 524 and oxygen 536 from the oxygen storage vessel 526 may be received into the pre-heater 516 and undergo an combustion reaction to efficiently heat the deionized water 512 and form the heated deionized water stream 514. The product of the combustion reaction is $H_2O$, which may be recycled into the solid carbon production system 500 (e.g. directed into the electrolyzer 518) without the need for an additional heat exchanger. At least one of the hydrogen in the hydrogen storage vessel 524 and the oxygen in the oxygen storage vessel 526 may be used in a similar manner to further heat the heated source gas stream 105 (e.g., by way of the heater 104) before the heated source gas stream 105 is delivered into the reactor 106. Utilizing the at least one of the hydrogen in the hydrogen storage vessel 524 and the oxygen in the oxygen storage vessel 526 as described above advantageously reduces the electrical power requirements of the solid carbon production system 500 by enabling the utilization of direct thermal energy.

Figure 7:
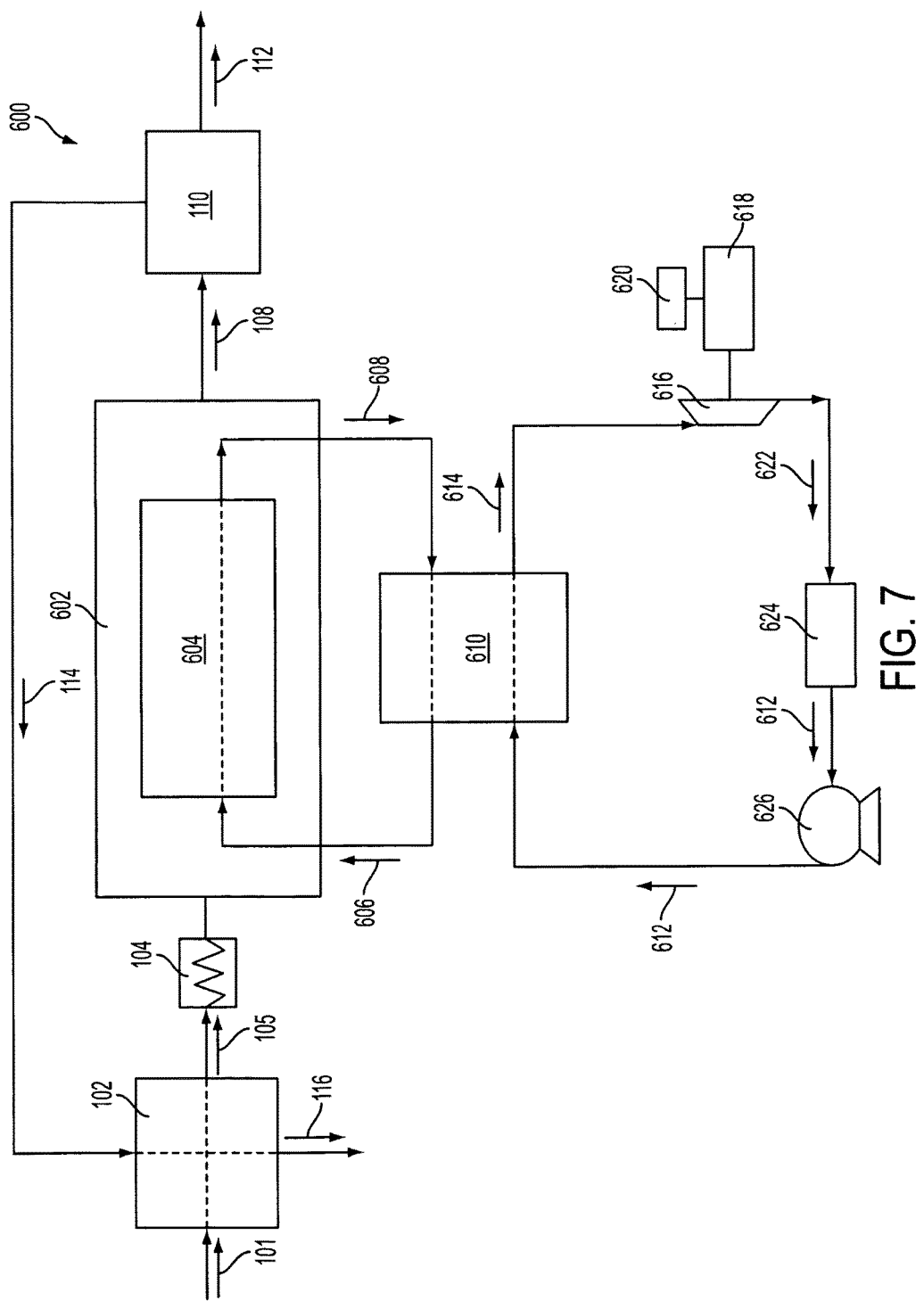

Another embodiment of the disclosure will now be described with reference to FIG. 7, which schematically illustrates a solid carbon production system 600. The solid carbon production system 600 of FIG. 7 is similar to the solid carbon production system 100 of FIG. 2, but includes additional heat-recovery modifications that may increase process efficiency and/or reduce operational costs. As shown in FIG. 7, the solid carbon production system 600 may include a reactor 602 having an internal heat exchanger 604 disposed therein. Except for the inclusion of the internal heat exchanger 604, the reactor 602 may be configured and operated in a substantially similar manner to the reactor 106 described above with reference to FIG. 2. In additional embodiments, the solid production system 600 of FIG. 7 may include a heat exchanger (not shown) externally disposed over and in contact with the reactor 602. By way of non-limiting example, the heat exchanger may be wrapped around (e.g., coiled around) at least a portion of the reactor 602. The heat exchanger may be provided in place of the internal heat exchanger 604 (i.e., as an alternative to the internal heat exchanger 604), or in combination with the internal heat exchanger 604.

The internal heat exchanger 604 may be an apparatus or device configured and operated to transfer heat (e.g., such as heat generated by the exothermic reduction reaction described above) from hot reaction gases within the reactor 602 (e.g., the reaction product stream 108 within the reactor 602) to a first exchange fluid 606. By way of non-limiting example, the internal heat exchanger 604 may be a shell-and-tube heat exchanger, a plate heat exchanger, a plate-fin heat exchanger, a spiral heat exchanger, or any other type of heat transfer apparatus. The internal heat exchanger 604 may, for example, include tubes (not shown) oriented transversely or axially to a longitudinal axis (not shown) of the reactor 602, such that the hot reaction gases flow across or along the lengths of the tubes.

In at least some embodiments, the internal heat exchanger 604 is a plate-fin heat exchanger. The internal heat exchanger 604 may be formed of and include a material (e.g., metal) suitable for temperatures, pressures, and materials within the reactor 602. By way of non-limiting example, the internal heat exchanger 604 may be formed of and include a high chromium stainless steel. Some stainless steels may provide an active catalytic surface for the carbon oxide reduction reactions (e.g., the Bosch reaction) previously described herein, so components of the internal heat exchanger 604 in contact with the reaction gases in the reactor 602 may be formed of and include at least one of a metal and a metal alloy exhibiting enhanced resistance to metal dusting. In some embodiments, at least a portion (e.g., portions interacting with the heated source gas stream 105) of the internal heat exchanger 604 is formed of and includes at least one of Kanthal APM and INCONEL® alloy 693. In one or more embodiments, at least one flow control device (not shown) may be positioned proximate at least one of an inlet and an outlet of the internal heat exchanger 604 to control a flow rate of the first exchange fluid 606 and regulate heat exchange rate between the hot reaction gases within the reactor 602 and the first exchange fluid 606.

The first exchange fluid 606 may be a material suitable for receiving heat from the hot reaction gases within the reactor 602. The first exchange fluid 606 may, for example, be selected to enable the internal heat exchanger 604 to be operated at low pressures, such as at or near atmospheric pressure. The first exchange fluid 606 may have a high heat capacity and a high heat transfer coefficient. As a non-limiting example, the first exchange fluid 606 may be a molten salt (e.g., molten $NaNO_3$, a molten mixture of $NaNO_3$ and $KNO_3$, a molten mixture of $LiF$ and $BeF_2$, etc.) or helium. An operating temperature of the first exchange fluid 606 may be maintained below a maximum operating temperature of the first exchange fluid 606 at least partially by the flow rate of the first exchange fluid 606 through the internal heat exchanger 604. A heated first exchange fluid 608 may exit the internal heat exchanger 604 and may be directed into an external heat exchanger 610.

The external heat exchanger 610 may be any suitable apparatus or device known in the art for exchanging heat from one fluid or gas to another fluid. By way of non-limiting example, the external heat exchanger 610 may be a recuperative heat exchanger (e.g., a shell-and-tube heat exchanger) that functions to cool the heated first exchange fluid 608 while vaporizing a second exchange fluid 612 to produce high-pressure vapor 614. The second exchange fluid 612 may be selected such that heat is efficiently recovered from the heated first exchange fluid 608, and such that a expansion turbine 616 may be operated efficiently, as described below. In at least some embodiments, the second exchange fluid 612 is water, and the high-pressure vapor 614 is high-pressure steam.

The high-pressure vapor 614 exiting an outlet of the external heat exchanger 610 may have a temperature of greater than or equal to about 300° C. The high-pressure vapor 614 may be delivered into the expansion turbine 616, as described below. In additional embodiments, the second exchange fluid 612 may remain in a substantially liquid phase (e.g., as a hot, high pressure exchange fluid) following heating in the external heat exchanger 610, and may flash into the high-pressure vapor 614 upon delivery into the expansion turbine 616.

The first exchange fluid 606 exiting another outlet of the external heat exchanger 610 may be directed (e.g., pumped) back into the internal heat exchanger 604 to facilitate another pass therethrough. In additional embodiments, one or more heat exchangers may be provided downstream of the external heat exchanger 610 to further control the temperature of the first exchange fluid 606 entering the internal heat exchanger 604. In additional embodiments, at least one flow control device (not shown) may be positioned proximate at least one of an inlet and an outlet of the external heat exchanger 610 to control a flow rate of at least one of the first exchange fluid 606 and the second exchange fluid 612 and to regulate the heat exchange rates thereof.

In additional embodiments, the external heat exchanger 610, the first exchange fluid 606, and the heated first exchange fluid 608 may, optionally, be omitted such that the second exchange fluid 612 is flowed directly through the internal heat exchanger 604 and is heated therein to produce the high-pressure vapor 614.

The expansion turbine 616 (e.g., steam turbine) may receive the high-pressure vapor 614 from the external heat exchanger 610 and may use the high-pressure vapor 614 to produce work (i.e., mechanical power) to drive a generator 618. Electrical power generated by the generator 618 may be coupled to a power bus 620. The electrical power from the power bus 620 may be utilized as desired, such as to at least partially power one or more devices or apparatuses (e.g., various pumps, various compressors, the reactor 602, the heater 104 if the heater 104 is an electrical resistance heater, etc.) of the solid carbon production system 600. In additional embodiments, the expansion turbine 616 may be mechanically coupled to directly drive at least one other device or apparatus of the solid carbon production system 600 (e.g., at least one pump, at least one compressor, etc.). Expansion turbine exhaust 622 may be condensed in at least one condenser 624 to again form the second exchange fluid 612. The second exchange fluid 612 may be pressurized in pump 626 and may be directed into the external heat exchanger 610 to facilitate additional thermal energy recovery. A composition of the second exchange fluid 612 may, optionally, be modified in response to changes in at least one of the temperature of the heated first exchange fluid 608 and the temperature of expansion turbine exhaust 622 (e.g., to sustain the heat-recovery efficiency of the solid carbon production system 600).

In additional embodiments, a solid carbon production system may be configured and operated to include a series of reactors. Such a solid carbon production system is described in U.S. Provisional Patent Application No. 61/624,723, filed on Apr. 16, 2012, previously incorporated by reference in its entirety herein. If, for example, the series of reactors includes at least one reactor facilitating an endothermic reaction (e.g., a first reactor primarily facilitating a reaction according to Equation 2 above) and at least one other reactor facilitating an exothermic reaction (e.g., a second reactor, located downstream of the first reactor, primarily facilitating a reaction according to at least one of Equations 3 and 4 above), thermal energy may be extracted from one or more of the at least one other reactor and an effluent stream thereof using one or more of the methods and systems described above.

The following example serves to explain an embodiments of the disclosure in more detail. The example is not to be construed as being exhaustive or exclusive as to the scope of the disclosure.

EXAMPLE

Simulations were performed for the solid carbon production systems depicted in each of FIGS. 2 through 7, and were compared to a base simulation for a solid carbon production system not including thermal energy recovery and conversion modifications. The base simulation included a solid carbon production system similar to the solid carbon production system 100 previously described in relation to FIG. 1, except not including the heat exchanger 102. Operational parameters for each of the simulations included a source gas stream including $CH_4$ and $CO_2$ at a ratio of about 1:1, and a Gibbs minimization reactor operating at a temperature of about 1200° F. (i.e., about 650° C.) and a pressure of about 600 psi (i.e., $4.14 \times 10^6$ pascal). The operational parameters were selected to facilitate production of solid carbon through Equations 3 through 5 with about a 20 percent conversion of reactants to solid carbon for each of Equations 3 through 5. The simulation results are summarized below in Table 1.

TABLE 1

| Base Simulation | |
| --- | --- |
| Cooling Requirements | 80,956.8 kJ/kg carbon |
| Heating Requirements | 112,097.9 kJ/kg carbon |
| Simulation 1 (system of FIG. 2) | |
| Cooling Requirements | 0 kJ/kg carbon |
| Heating Requirements | 31,141.1 kJ/kg carbon |
| Simulation 2 (system of FIG. 3) | |
| Turbine Electrical Energy Generated | 20,563.5 kJ/kg carbon |
| Simulation 3 (system of FIG. 4) | |
| Turbine Electrical Energy Generated | 20,563.5 kJ/kg carbon |
| Electrolysis + Heater Energy Used | −25,092.9 kJ/kg carbon |
| Grid Electrical Energy Needs | −4,529.5 kJ/kg carbon |
| Simulation 4 (system of FIG. 5) | |
| Net Turbine Electrical Energy Generated after pump loses | 31,098.0 kJ/kg carbon |
| Simulation 5 (system of FIG. 6) | |
| Net Turbine Electrical Energy Generated after pump loses | 31,098.0 kJ/kg carbon |
| Electrolysis + Heater Energy Used | −25092.9 kJ/kg carbon |
| Net Electrical Energy Generated | 6,005.1 kJ/kg carbon |
| Simulation 5 (system of FIG. 7) | |
| Reactor Heat Extracted | 870.1 kJ/kg carbon |
| Cooling Requirements | 0 kJ/kg carbon |
| Heating Requirements | 31,141.1 kJ/kg carbon |

The simulation results indicate that the solid carbon production systems and methods of the disclosure result in energy savings as compared to solid carbon production systems not including thermal energy recovery and conversion modifications. For example, simulation 1 (i.e., for the solid carbon production system 100 of FIG. 2) resulted in a 100 percent energy savings in cooling requirements and a 72.22 percent energy savings in cooling requirements as compared to the base simulation.

While the disclosure is susceptible to various modifications and alternative forms, specific embodiments have been shown by way of example in the drawings and have been described in detail herein. However, the disclosure is not intended to be limited to the particular forms disclosed. Rather, the disclosure is to cover all modifications, equivalents, and alternatives falling within the scope of the invention as defined by the following appended claims and their legal equivalents. For example, elements and features disclosed in relation to one embodiment may be combined with elements and features disclosed in relation to other embodiments of the disclosure.

What is claimed is:

1. A method of thermal energy recovery from production of at least one solid carbon material, the method comprising:
reacting at least one carbon oxide material with at least one gaseous reducing material at a temperature of greater than or equal to about 400° C., at a pressure of greater than or equal to about $1 \times 10^5$ pascal, and in the presence of at least one catalyst material to produce at least one solid carbon material and a gaseous effluent stream comprising water vapor;
combining the gaseous effluent stream with at least one fluid selected from the group consisting of steam and liquid water;
separating at least a portion of the at least one solid carbon material from the gaseous effluent stream; and
after separating the at least a portion of the at least one solid carbon material from the gaseous effluent stream, extracting thermal energy from the gaseous effluent stream by transferring thermal energy via a heat exchanger comprising a ceramic material from the gaseous effluent stream to at least one of the at least one carbon oxide material and the at least one gaseous reducing material.

2. The method of claim 1, wherein reacting at least one carbon oxide material with at least one reducing material in the presence of at least one catalyst material comprises reacting the at least one carbon oxide material with the at least one reducing material at a temperature of greater than or equal to about 500° C. and a pressure within a range of from about $1 \times 10^5$ pascal to about $1 \times 10^9$ pascal.

3. The method of claim 1, wherein the at least one gaseous reducing material comprises at least one of hydrogen and a hydrogen-containing compound.

4. The method of claim 1, wherein the at least one catalyst material comprises at least one element selected from Groups 5 through 10 of the Periodic Table of Elements.

5. The method of claim 1, wherein extracting thermal energy from the gaseous effluent stream comprises cooling the gaseous effluent stream with at least one cooling material to produce a cooled gaseous effluent stream comprising liquid water and provide thermal energy to the at least one cooling material.

6. A method of generating recoverable thermal energy, the method comprising:
introducing a source gas stream comprising at least one carbon oxide and at least one gaseous reducing material to a reactor having at least one catalyst material therein;
reacting the at least one carbon oxide with the at least one reducing agent in the presence of the at least one catalyst material to produce a reaction product stream comprising at least one solid carbon material and gaseous water;
combining the reaction product stream with at least one fluid selected from the group consisting of steam and liquid water;
separating the at least one solid carbon material from the gaseous water; and
after separating the at least one solid carbon material from the gaseous water, extracting heat from at least the gaseous water via a heat exchanger comprising a ceramic material by transferring heat from at least the gaseous water to the source gas stream before the source gas stream is provided to the reactor.

7. A method of thermal energy recovery from production of at least one solid carbon material, the method comprising:
reacting at least one carbon oxide material and at least one gaseous reducing material at a temperature of greater than or equal to about 400° C., at a pressure of greater than or equal to about $1 \times 10^5$ pascal, and in the presence of at least one catalyst material to produce at least one solid carbon material and a gaseous effluent stream comprising water vapor;
combining the gaseous effluent stream with at least one fluid selected from the group consisting of steam and liquid water;
separating at least a portion of the at least one solid carbon material from the gaseous effluent stream; and
after separating the at least a portion of the at least one solid carbon material from the gaseous effluent stream, extracting thermal energy from the gaseous effluent stream by transferring thermal energy via a heat exchanger comprising a ceramic material to at least one exchange fluid to form at least one high-pressure vapor.

8. The method of claim 7, further comprising expanding the at least one high-pressure vapor to produce work and generate electrical power.

9. A method of thermal energy recovery from production of at least one solid carbon material, the method comprising:
reacting at least one carbon oxide material with at least one gaseous reducing material at a temperature of greater than or equal to about 400° C., at a pressure of greater than or equal to about $1 \times 10^5$ pascal, and in the presence of at least one catalyst material to produce at least one solid carbon material and a gaseous effluent stream comprising water vapor;
combining the gaseous effluent stream with at least one fluid selected from the group consisting of steam and liquid water;
separating at least a portion of the at least one solid carbon material from the gaseous effluent stream;
after separating the at least a portion of the at least one solid carbon material from the gaseous effluent stream, extracting thermal energy from the gaseous effluent stream via a heat exchanger comprising a ceramic material by cooling the gaseous effluent stream with at least one cooling material to produce a cooled gaseous effluent stream comprising liquid water and provide thermal energy to the at least one cooling material; and
electrolyzing the liquid water to produce hydrogen gas and oxygen gas.

10. The method of claim 9, further comprising recycling at least a portion of the hydrogen gas to the gaseous reducing material.

11. A method of generating recoverable thermal energy, the method comprising:
introducing a source gas stream comprising at least one carbon oxide and at least one gaseous reducing material to a reactor having at least one catalyst material therein;
reacting the at least one carbon oxide with the at least one reducing agent in the presence of the at least one catalyst material to produce a reaction product stream comprising at least one solid carbon material and gaseous water;
combining the reaction product stream with at least one fluid selected from the group consisting of steam and liquid water;
separating the at least one solid carbon material from the gaseous water; and after separating the at least a portion of the at least one solid carbon material from the gaseous water, extracting heat from at least the gaseous water by:
  transferring heat from at least the gaseous water via a heat exchanger comprising a ceramic material to a first heat exchange fluid to form a heated first heat exchange fluid; and
  transferring heat from the heated first heat exchange fluid to a second heat exchange fluid.

12. A method of generating recoverable thermal energy, the method comprising:
  introducing a source gas stream comprising at least one carbon oxide and at least one gaseous reducing material to a reactor having at least one catalyst material therein;
  reacting the at least one carbon oxide with the at least one reducing agent in the presence of the at least one catalyst material to produce a reaction product stream comprising at least one solid carbon material and gaseous water;
  combining the reaction product stream with at least one fluid selected from the group consisting of steam and liquid water;
  separating the at least one solid carbon material from the gaseous water; and
  after separating the at least a portion of the at least one solid carbon material from the gaseous water, extracting heat from at least the gaseous water via a heat exchanger comprising a ceramic material by transferring heat from at least the gaseous water to liquid water fluidly separated from the gaseous water to generate high-pressure steam.

13. The method of claim 12, further comprising:
  expanding the high-pressure steam in an expansion turbine to produce work and generate electrical power; and
  condensing expansion turbine exhaust to form the liquid water.

* * * * *